United States Patent
Rafferty et al.

(10) Patent No.: US 11,551,171 B2
(45) Date of Patent: Jan. 10, 2023

(54) UTILIZING NATURAL LANGUAGE PROCESSING AND MACHINE LEARNING TO AUTOMATICALLY GENERATE PROPOSED WORKFLOWS

(71) Applicant: Capital One Services, LLC, McLean, VA (US)

(72) Inventors: Galen Rafferty, Mahomet, IL (US); Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 83 days.

(21) Appl. No.: 16/918,686

(22) Filed: Jul. 1, 2020

(65) Prior Publication Data
US 2022/0004954 A1    Jan. 6, 2022

(51) Int. Cl.
*G06Q 10/06*    (2012.01)
*G06Q 10/10*    (2012.01)
(Continued)

(52) U.S. Cl.
CPC ....... *G06Q 10/06316* (2013.01); *G06F 40/30* (2020.01); *G06N 20/00* (2019.01); *G06Q 10/103* (2013.01)

(58) Field of Classification Search
CPC ............ G06Q 10/06316; G06Q 10/103; G06F 40/30; G06N 20/00
See application file for complete search history.

(56) References Cited

U.S. PATENT DOCUMENTS 7,676,407 B2    3/2010    Van De Van et al.
9,477,522 B2    10/2016    Harper et al.
(Continued)

FOREIGN PATENT DOCUMENTS

WO    WO-2018081833 A1 *    5/2018    ............ G06F 15/16
WO    2020/055904 A1    3/2020

OTHER PUBLICATIONS

A. Kavimandan et al. "Automated Context-Sensitive Dialog Synthesis for Enterprise Workflows Using Templatized Model Transformations," 2008 12th International IEEE Enterprise Distributed Object Computing Conference, 2008, pp. 159-168, doi: 10.1109/EDOC.2008.45. (Year: 2008).*

*Primary Examiner* — Mehmet Yesildag
*Assistant Examiner* — Jeremy L Gunn
(74) *Attorney, Agent, or Firm* — Harrity & Harrity, LLP

(57) ABSTRACT

A workflow generation system may receive communication data identifying a communication created by a user of a client device, and may process the communication data, with a machine learning model, to determine whether a workflow is needed and particular recipients to be included in the workflow. The machine learning model may be trained based on historical communication data, historical workflow data based on natural language processing, and historical response data based on a sentiment analysis. The workflow generation system may generate a proposed workflow when the workflow is determined to be needed and based on the particular recipients, and may provide data identifying the proposed workflow to the client device. The workflow generation system may receive an approval of the proposed workflow from the client device, and cause the communication to be provided to the particular recipients, in a particular order, based on receiving the approval of the proposed workflow.

20 Claims, 16 Drawing Sheets

(51) Int. Cl.
  *G06N 20/00*    (2019.01)
  *G06F 40/30*    (2020.01)

(56)         References Cited

U.S. PATENT DOCUMENTS

| | | | |
|---|---|---|---|
| 10,554,817 B1* | 2/2020 | Sullivan | H04L 41/5054 |
| 2018/0004732 A1* | 1/2018 | Brunn | G06F 3/04847 |
| 2018/0060819 A1* | 3/2018 | Feldman | G06Q 30/04 |
| 2019/0287106 A1 | 9/2019 | Sadeddin et al. | |
| 2019/0324893 A1* | 10/2019 | Vaishnav | G06F 11/3664 |
| 2019/0347668 A1* | 11/2019 | Williams | G06N 5/046 |
| 2020/0258013 A1* | 8/2020 | Monnett | G06Q 30/016 |
| 2020/0349481 A1* | 11/2020 | Prasad | G06Q 10/0633 |
| 2020/0379663 A1* | 12/2020 | Long | G06F 3/0608 |
| 2020/0387567 A1* | 12/2020 | Loforte | G06F 16/313 |
| 2021/0049525 A1* | 2/2021 | Unger | G06Q 10/0633 |

\* cited by examiner

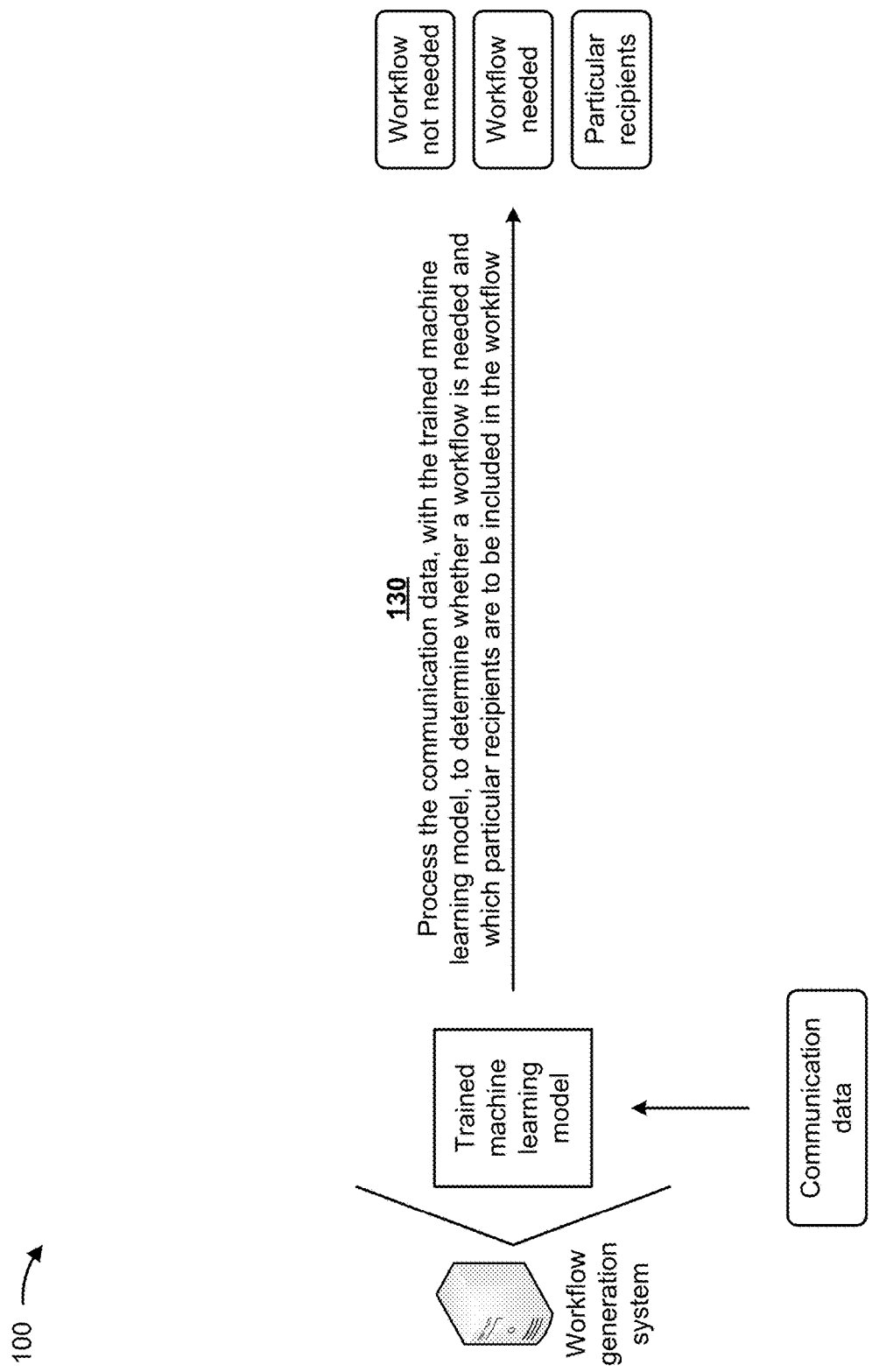

UTILIZING NATURAL LANGUAGE PROCESSING AND MACHINE LEARNING TO AUTOMATICALLY GENERATE PROPOSED WORKFLOWS

BACKGROUND

An approval chain may represent a series of approvals that must occur in a defined sequence. For example, a communication (e.g., an email) regarding a course of action (e.g., a contract review) may be provided to a first recipient, and may not be provided to a second recipient until approval of the course of action (e.g., a contract signature) is obtained from the first recipient.

SUMMARY

According to some implementations, a method may include receiving, from client devices, historical communication data identifying communications created by users of the client devices, wherein the historical communication data identifies recipients and recipient responses to the communications. The method may include performing natural language processing on the historical communication data to determine historical workflow data associated with characteristics of workflows, and performing a sentiment analysis of the historical communication data to determine historical response data identifying whether the recipient responses of the historical communication data indicate approvals, rejections, or commentaries. The method may include training a machine learning model, with the historical workflow data and the historical response data, to generate a trained machine learning model that determines proposed workflows. The method may include receiving, from a particular client device, communication data identifying a communication created by a particular user of the particular client device, and processing the communication response data, with the trained machine learning model, to determine whether a workflow is needed and which particular recipients are to be included in the workflow. The method may include generating a proposed workflow when the workflow is determined to be needed and based on the particular recipients, and providing data identifying the proposed workflow to the particular client device. The method may include receiving an approval of the proposed workflow from the particular client device, and causing the communication to be provided to the particular recipients, in a particular order, for approval based on receiving the approval of the proposed workflow.

According to some implementations, a workflow generation system may include one or more memories and one or more processors to receive, from a client device, communication data identifying a communication created by a user of the client device, wherein the communication data identifies recipients and recipient responses to the communication. The one or more processors may process the communication data, with a machine learning model, to determine whether a workflow is needed and which particular recipients are to be included in the workflow, wherein the machine learning model is trained based on: historical communication data identifying historical communications, historical recipients of the historical communications, and historical recipient responses to the historical communications; historical workflow data associated with characteristics of workflows; and historical response data identifying whether the historical recipient responses of the historical communication data indicate approvals, rejections, or commentaries. The one or more processors may generate a proposed workflow when the workflow is determined to be needed and based on the particular recipients, and provide data identifying the proposed workflow to the client device. The one or more processors may receive an approval of the proposed workflow from the client device, and cause the communication to be provided to the particular recipients, in a particular order, for approval based on receiving the approval of the proposed workflow.

According to some implementations, a non-transitory computer-readable medium may store one or more instructions that, when executed by one or more processors of a device, may cause the one or more processors to receive, from a client device, communication data identifying a communication created by a user of the client device, wherein the communication data identifies recipients and recipient responses to the communication. The one or more instructions may cause the one or more processors to process the communication data, with a machine learning model, to determine whether a workflow is needed and which particular recipients are to be included in the workflow. The one or more instructions may cause the one or more processors to generate a proposed workflow when the workflow is determined to be needed and based on the particular recipients; calculate a confidence score for the proposed workflow, and provide the confidence score and data identifying the proposed workflow to the client device. The one or more instructions may cause the one or more processors to receive an approval of the proposed workflow from the client device, and cause the communication to be provided to the particular recipients, in a particular order, for approval based on receiving the approval of the proposed workflow.

BRIEF DESCRIPTION OF THE DRAWINGS

FIGS. 1A-1J are diagrams of an example implementation described herein.

DETAILED DESCRIPTION

Figure 1A:
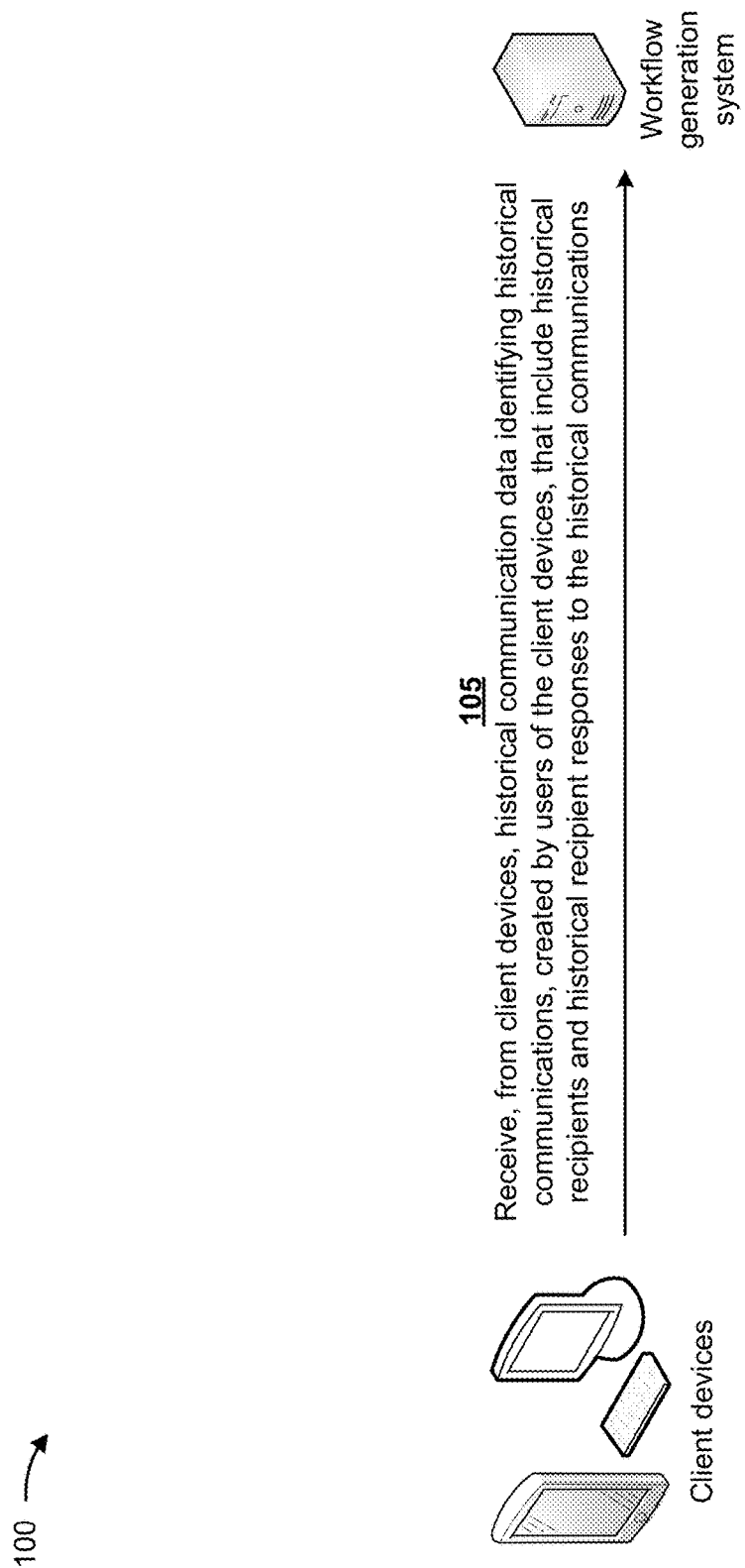

The following detailed description of example implementations refers to the accompanying drawings. The same reference numbers in different drawings may identify the same or similar elements.

A user may engage in a communication (e.g., an email) that could potentially be associated with an approval chain (e.g., of transmissions of the email to an ordered sequence of recipients). In order to implement a workflow that facilitates the approval chain, the user must personally determine that the workflow is to be implemented, and must either manually initiate and manage the communications or rely on an external workflow system to do so. Currently there does not exist a technique to automatically identify a potential workflow based on content of the communication, or to automatically generate a proposed workflow based on identifying the potential workflow. Thus, current workflow generation techniques may waste computing resources (e.g., processing resources, memory resources, communication resources, and/or the like), networking resources, and/or the like associated with actions required by the user and/or utilization of an external workflow system, additional actions required to remedy delays in the communications, and/or the like.

Some implementations described herein provide a workflow generation system that utilizes a machine learning model to automatically generate a proposed workflow. For example, the workflow generation system may receive, from client devices, historical communication data identifying communications created by users of the client devices, wherein the historical communication data identifies recipients and recipient responses to the communications. The workflow generation system may perform natural language processing on the historical communication data to determine historical workflow data identifying if and when workflows are to be created for the communications. The workflow generation system may perform a sentiment analysis of the historical communication data to determine historical response data identifying whether the recipient responses of the historical communication data indicate approvals, rejections, or commentaries. The workflow generation system may train a machine learning model, with the historical workflow data and the historical response data, to generate a trained machine learning model that determines proposed workflows. The workflow generation system may receive, from a particular client device, communication data identifying a communication created by a particular user of the particular client device, and process the communication response data, with the trained machine learning model, to determine whether a workflow is needed and which particular recipients are to be included in the workflow. The workflow generation system may generate a proposed workflow when the workflow is determined to be needed and based on the particular recipients, and provide data identifying the proposed workflow to the particular client device. The workflow generation system may receive an approval of the proposed workflow from the particular client device, and cause the communication to be provided to the particular recipients, in a particular order, for approval based on receiving the approval of the proposed workflow.

In this way, the workflow generation system utilizes a machine learning model to automatically generate a proposed workflow. As a result, a workflow can be generated without the user personally determining to generate the workflow, and without the user manually initiating or controlling the workflow or relying on an external workflow system to do so. This, in turn, conserves computing resources (e.g., processing resources, memory resources, communication resources, and/or the like), networking resources, and/or the like that would otherwise be wasted as a result of actions required by the user and/or utilization of an external workflow system, additional actions required to remedy delays in the communications, and/or the like.

FIGS. 1A-1J are diagrams of an example 100 associated with utilizing natural language processing and machine learning to automatically generate proposed workflows. As shown in FIGS. 1A-1J, example 100 includes client devices and a workflow generation system. A client device, of the client devices, may include a computing and/or communication device (e.g., a wireless communication device, a mobile phone, a laptop computer, a tablet computer, a handheld computer, a desktop computer, a wearable communication device, or a similar type of device) that includes a communication application (e.g., an email application, an instant messaging application, a planning application (e.g., Microsoft Planner), a telecommunications application, and/or the like). The workflow generation system may include one or more computing devices that utilize a machine learning model to automatically generate a proposed workflow, as described herein.

As shown in FIG. 1A, and by reference number 105, the workflow generation system may receive, from client devices, historical communication data identifying historical communications, created by users of the client devices, that include historical recipients and historical recipient responses to the communications. The historical communications may include email communications (e.g., associated with an email application), instant messaging communications (e.g., associated with an instant messaging application), planning communications (e.g., associated with a planning application), telecommunications (e.g., associated with a telecommunications application), and/or the like that are sent by the client devices and received by the client devices. As an example, historical communication data associated with an email may include historical communications (e.g., content of the email, metadata associated with the email, such as a sender or a time stamp, and/or the like), historical recipients (e.g., recipients of the email or related emails), and historical recipient responses to the communications (e.g., responses to the email or related emails by recipients, a time stamp for each response, and/or the like).

In some implementations, the workflow generation system may identify or determine additional information associated with historical communications, and may include the additional information in the historical communication data. For example, the additional information may include a role, organization, function, industry, and/or the like associated with each of one or more of the users and/or historical recipients associated with the historical communications. In this case, the workflow generation system may reference employee information associated with a company that employs the users and/or historical recipients, may perform natural language processing on the historical communications, and/or the like to identify and/or determine the additional information. The additional information may be utilized by the workflow generation system in performing natural language processing, performing sentiment analysis, training and/or processing a machine learning model, and/or the like, as described herein.

The historical communication data may include information relating to historical communications that are part of a workflow. In this case, the historical communications may include communications that sequentially elicit recipients of the communications to respond to the communications (e.g., approving content of the communications, rejecting the content of the communications, commenting on the content of the communications, and/or the like). The historical recipients may communicate the approvals, rejections, and/or comments as historical recipient responses. In some implementations, the historical communication data may include historical communications that are not part of a workflow. In this case, the workflow generation system may use the historical communication data that includes historical communications that are not part of a workflow to train a machine learning model as to what types of communications are typically related to a workflow and what types of communications are not typically related to a workflow. In some implementations, the workflow generation system may only train the machine learning model with historical communications data that includes historical communications that relate to a workflow.

Figure 1B:
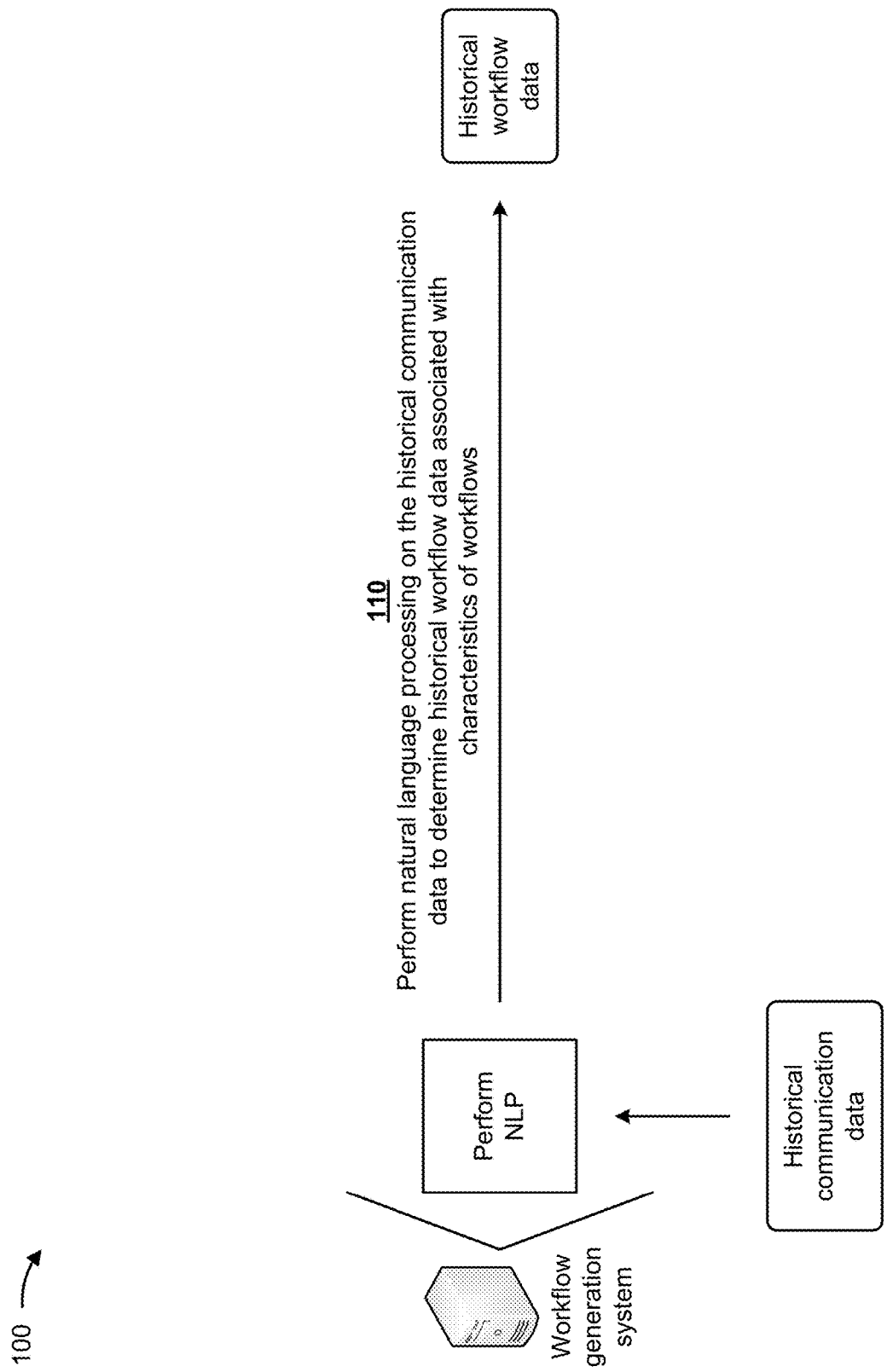

As shown in FIG. 1B, and by reference number 110, the workflow generation system may perform natural language processing on the historical communication data to determine historical workflow data associated with characteristics of workflows. For example, the historical workflow data may apply natural language processing (e.g., a natural language processing model, algorithm, and/or the like) to identify features (e.g., words, phrases, terms, relationships, and/or the like) in the content of the historical communications that may be relevant to whether a communication is associated with a workflow. As described below with respect to FIG. 1D, the identified features may be utilized by a machine learning model to determine whether a workflow will be needed in association with a given communication.

Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak.

In some implementations, the workflow generation system may parse the content of the historical communications, may append and/or reduce the content (e.g., to identify prevalent words, eliminate insignificant words, and/or the like), may format the historical communications for use by the machine learning model, and may include the parsed, appended, reduced, and/or formatted content in the historical workflow data. In some implementations, the workflow generation system may apply additional factors, rules, weights, and/or the like related to identifying elements of workflows. For example, the workflow generation system may identify and extract references to individuals who are recipients of a historical communication, may identify language that indicates a sequence of communications, may identify language that indicates a need for approval of communications, and/or the like.

In some implementations, the workflow generation system may determine whether workflows were created for the historical communications, and may include the determinations in the historical workflow data. For example, for a particular historical communication, the workflow generation system may determine whether a workflow was created, and may include the determination in the historical workflow data for the particular historical communication. In some implementations, the workflow generation system may base the determination on identifying a set and/or sequence of communications that occurred with respect to the particular historical communication. Additionally, or alternatively, the workflow generation system may base the determination on input from an operator, on input from an external workflow system that created a workflow in association with the particular historical communication, and/or the like. In some implementations, the historical communications may be processed, filtered, selected, and/or the like to contain only historical communications for which workflows were created.

In some implementations, such as in a case where the historical communications include telecommunications, the workflow generation system may utilize speech recognition to convert spoken words to text prior to performing natural language processing on the historical communication data. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences.

Figure 1C:
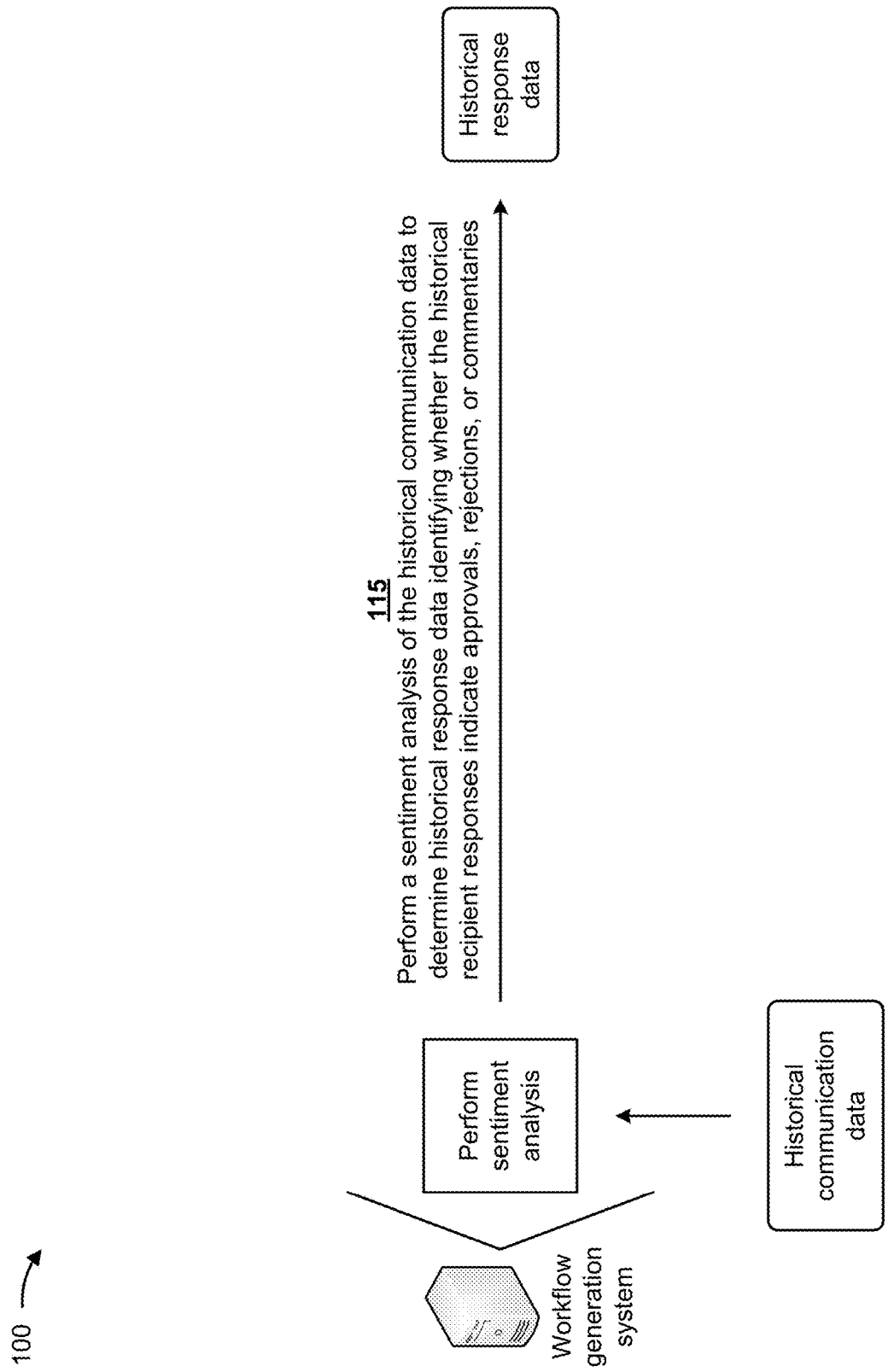

As shown in FIG. 1C, and by reference number 115, the workflow generation system may perform a sentiment analysis of the historical communication data to determine historical response data identifying whether the historical recipient responses of the historical communication data indicate approvals, rejections, or commentaries. For example, the sentiment analysis (e.g., a sentiment analysis model, algorithm, and/or the like) may identify sentiments associated with the historical recipient responses, and may use the sentiments to determine whether historical recipient responses indicate approvals, rejections, or commentaries. As described below with respect to FIG. 1D, the determination may be utilized by a machine learning model to determine selection of recipients for an approval chain of a workflow, a sequence of communications for an approval chain of a workflow, and/or the like.

Sentiment analysis involves extracting subjective information (e.g., mood, feelings, inclinations, and/or the like) from content to determine sentiments about specific subjects. In this case, for example, the sentiment analysis may be applied to historical communications involving courses of action (e.g., approval of a contract), to determine whether historical recipients appear to approve of or reject the courses of action. In some implementations, the sentiment analysis may identify a polarity (e.g., positive, negative, or neutral) based on content of a historical recipient response, and may determine whether the historical recipient response indicates an approval, rejection, or commentary based on the identified polarity. For example, a positive polarity may indicate an approval, a negative polarity may indicate a rejection, and/or the like. Additionally, or alternatively, the sentiment analysis may identify an emotion (e.g., angry, sad, happy, and/or the like) based on content of a historical recipient response, and may determine whether the historical recipient response indicates an approval, rejection, or commentary based on the identified emotion. In some implementations, such as in a case where the historical communications include telecommunications, the workflow generation system may utilize speech recognition to convert spoken words to text prior to performing the sentiment analysis.

In some implementations, the workflow generation system may apply a same sentiment analysis model or algorithm to a comprehensive set of historical communications relating to different users, different recipients, and/or the like. Additionally, or alternatively, the workflow generation system may perform multiple sentiment analyses, each sentiment analysis being based on a specific user, a specific recipient, a specific type of user or recipient (e.g., corresponding to a particular role, function, organization, and/or the like), a specific form of communication (e.g., email, instant message, and/or the like), and/or the like. As an example, a particular recipient may frequently use the word "bad" to describe concepts the particular recipient views favorably. In this case, for a response by the particular recipient, a sentiment analysis model or algorithm that uniformly applies to all recipients may associate the term "bad" with a rejection, whereas a sentiment analysis model or algorithm that is specifically based on the particular recipient may associate the term "bad" with an approval.

Figure 1D:
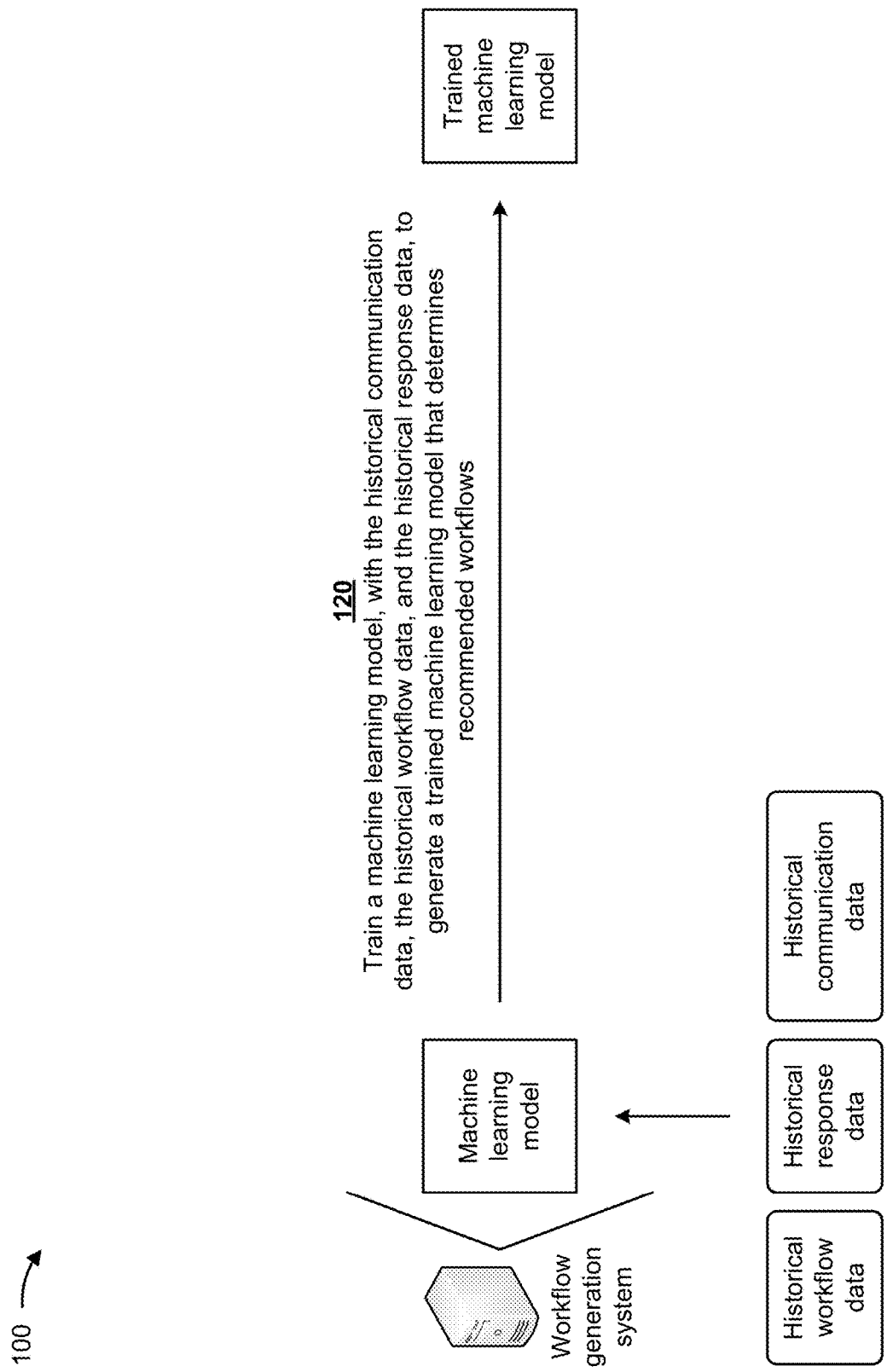

As shown in FIG. 1D, and by reference number 120, the workflow generation system may train a machine learning model, with the historical communication data, the historical workflow data, and the historical response data, to generate a trained machine learning model that determines recommended workflows. As described herein, the machine learning model may be trained to process communication data associated with a communication in order to indicate whether a workflow is needed and, if a workflow is needed, to generate a proposed workflow that identifies recipients of the communication and an order in which the recipients are to receive the communication.

For example, the workflow generation system may train the machine learning model in a manner similar to the manner described below in connection with FIG. 2. In some implementations, rather than training the machine learning model, the workflow generation system obtains the machine learning model from another system or device that trained the machine learning model. In this case, the workflow generation system may provide the other system or device with historical data for use in training the machine learning model, and may provide the other system or device with updated historical data to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space, and/or the like.

In some implementations, the machine learning model is trained, based on the historical workflow data, to determine whether a workflow is needed for a new communication. For example, the machine learning model may be trained to determine whether the workflow is needed based on identifying characteristics of the new communication that are similar to characteristics that have been identified in historical communications that have been determined to be workflows, as described above with respect to FIG. 1B.

In some implementations, the machine learning model is trained, based on the historical response data, to identify selected recipients for a new communication, and an order in which the selected recipients are to receive the new communication. For example, the machine learning model may be trained to select recipients (e.g., from a set of recipients identified by communication data associated with the new communication) for an approval chain in a workflow, and an order in which the selected recipients are to receive the new communication, based on whether historical recipient responses (e.g., associated with same or similar users and/or recipients) have been determined by a sentiment analysis to indicate approvals, rejections, or commentaries, as described above with respect to FIG. 1C. As a specific example, recipients who have more frequently approved historical communications that are similar to the new communication may be more likely to be selected to be in the workflow approval chain. As another example, recipients who have typically been earlier in approval chains associated with historical communications may be more likely to be selected to be earlier in the workflow approval chain than recipients who have typically been later in approval chains associated with historical communications.

In some implementations, the workflow generation system trains the machine learning model based on communications of users and recipients without regard to the nature (e.g., role, organization, and/or the like) of the users or recipients. Additionally, or alternatively, the workflow generation system may train multiple machine learning models, each machine learning model based on a particular user or a particular type of user (e.g., users or recipients who perform a same or similar role, users or recipients related to a particular organization, function, or industry, users associated with a combination of such factors, and/or the like). For example, the workflow generation system may train a machine learning model, based on communications of users who perform a particular role (e.g., executive, manager, team leader, engineer, administrative assistant, receptionist, and/or the like) in a particular industry (e.g., software products and/or services), to generate a proposed workflow for a user who performs such a role in the particular industry. In this way, the workflow generation system may generate a generic workflow, a role-specific workflow, a function-specific workflow, an organization-specific workflow, an industry-specific workflow, and/or the like, as well as a workflow specific to a particular user.

Additionally, or alternatively, the workflow generation system may train a machine learning model that identifies such roles, functions, organizations, industries, and/or the like as factors in determining a proposed workflow and/or in identifying the recipients for the proposed workflow. For example, the machine learning model may be more likely to determine that a workflow is needed based on a communication by an engineering team leader that appears to relate to an engineering function and appears to include engineers as recipients. As another example, the machine learning model may identify recipients based on an engineering team leader communication that suggests review by the engineering team, without specifically identifying team members, and based on additional information that identifies team members of the engineering team.

Figure 1E:
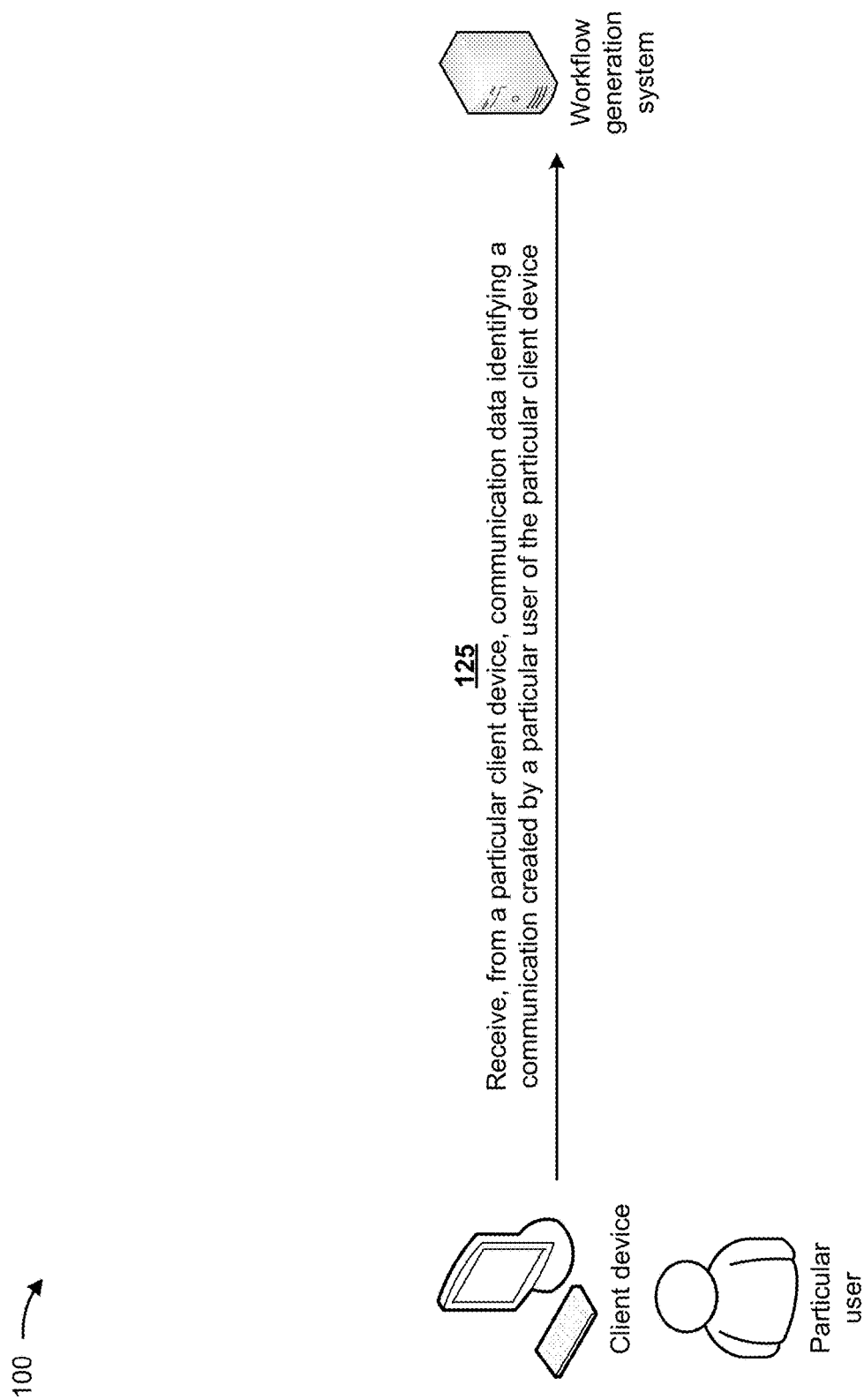

As shown in FIG. 1E, and by reference number 125, the workflow generation system may receive, from a particular client device, communication data identifying a communication created by a particular user of the particular client device. The communication may be an email communication, an instant messaging communication, a planning communication, a telecommunication, and/or the like. In a case where the communication is a telecommunication, the workflow generation system may utilize speech recognition to convert spoken words to text, and may include the text in the communication data. The communication may include information that would enable recipients to approve content of the communication, reject the content of the communication, or comment on the content of the communication.

As shown in FIG. 1F, and by reference number 130, the workflow generation system may process the communication data, with the trained machine learning model, to determine whether a workflow is needed and which particular recipients are to be included in the workflow. In some implementations, the workflow generation system may process the communication data with the trained machine learning model based on receiving a request from the user, from the client device, and/or the like. Alternatively, the workflow generation system may automatically process the communication data with the trained machine learning model upon identifying the communication, receiving notification that the communication has occurred, and/or the like. When processing the communication data, the workflow generation system may apply the machine learning model to a new observation in a manner similar to the manner described below in connection with FIG. 2.

Figure 1G:
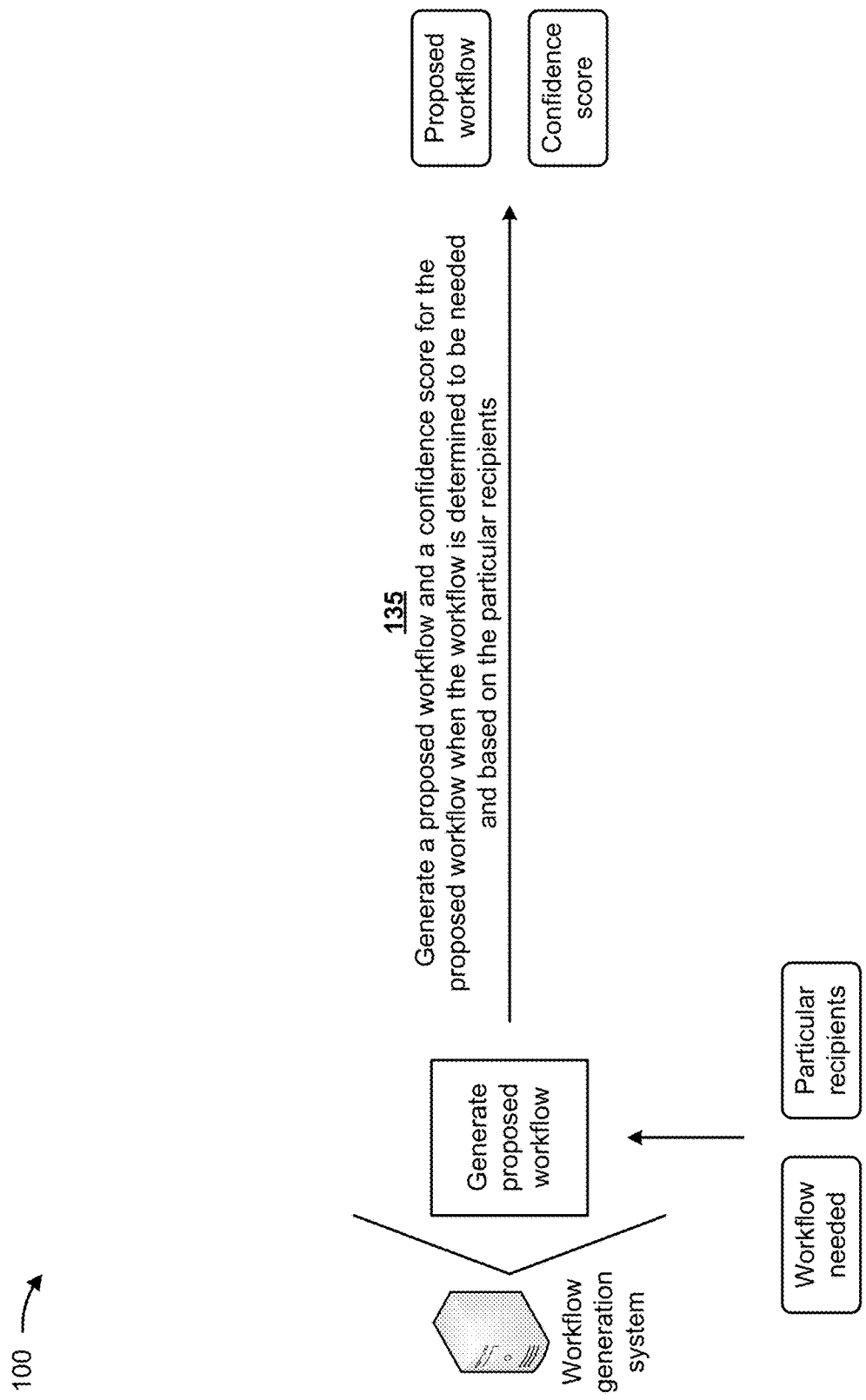

As shown in FIG. 1G, and by reference number 135, the workflow generation system may generate a proposed workflow and a confidence score for the proposed workflow when the workflow is determined to be needed and based on the particular recipients. The proposed workflow may define an approval chain for the communication created by the particular user. Although the communication is referred to herein as a singular communication when describing individual transmissions of the communication to different particular recipients, in practice a transmission of the communication to one recipient may vary in form and format, and/or may include additional information or less information compared to a transmission of the communication to another recipient.

The proposed workflow may include an ordered list of the particular recipients for approving the communication. In some implementations, the proposed workflow includes an ordered list of the particular recipients, data indicating that a first recipient is to receive the communication first, and data indicating that the other particular recipients are to receive the communication based on the ordered list. As an example, the proposed workflow may define an email approval chain with a first recipient, a second recipient, and a third recipient. In this case, the workflow generation system may cause a message to be initially provided to the first recipient, may cause the message to be provided to a second recipient only after the first recipient receives the message and responds to the message, and may cause the message to be provided to a third recipient only after the second recipient receives the message and responds to the message.

In some implementations, each response to a communication may determine whether the workflow generation system causes the communication to be sent to the next recipient. For example, the workflow generation system may cause the communication to be sent to a next recipient if a response indicates an approval, and may cause the message not to be sent to a next recipient if the response indicates a rejection. In this case, the workflow generation system may provide a message back to the particular user indicating that the communication was rejected, identifying the recipient that rejected the communication, and/or the like.

The confidence score may indicate a level of confidence that the workflow is accurate and appropriate (e.g., likely to work as intended and/or expected by the particular user). The machine learning model may determine the confidence score based on the communication data, the workflow data, and/or the response data described above. For example, the confidence score may be determined based on the content of the communication, identified recipients, a quantity of the recipients, and/or the like. As a specific example, the machine learning model may determine a high confidence score for a proposed workflow, based on a communication by a particular user to a same set of recipients, in a same sequence, as have previously been frequently associated with a workflow. In some implementations, the machine learning model may apply additional factors to determine the confidence score. For example, the machine learning model may base the confidence score on identified roles, functions, organizations, industries, and/or the like of the user and/or the recipients.

Figure 1H:
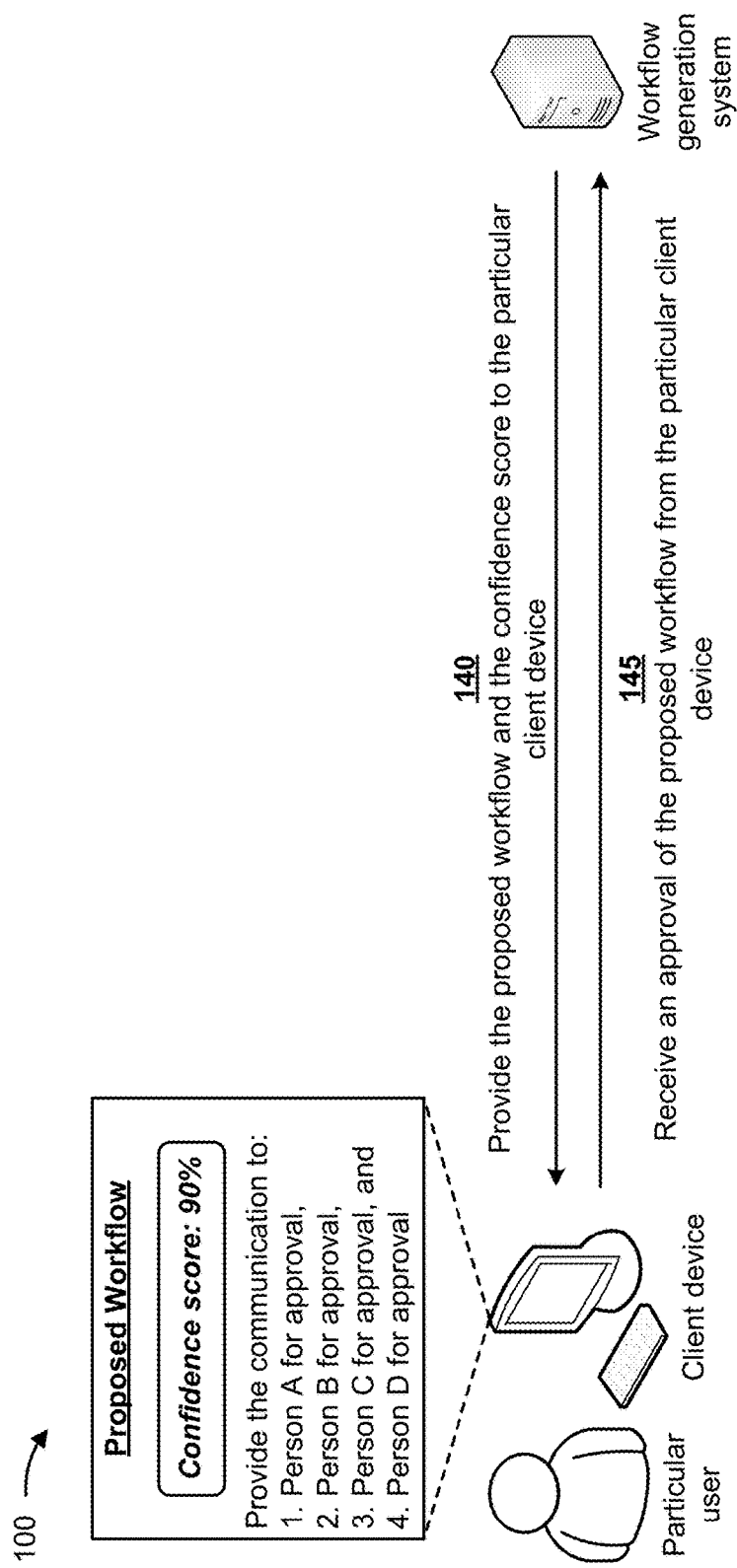

As shown in FIG. 1H, and by reference number 140, the workflow generation system may provide the proposed workflow and the confidence score to the particular client device. In some implementations, the workflow generation system may provide the proposed workflow to the particular client device only if the confidence score satisfies a confidence score threshold. In some implementations, upon receiving the proposed workflow and the confidence score, the particular client device displays a description of the proposed workflow (e.g., based on executing an application associated with the workflow generation system, via a user interface of the particular client device, and/or the like). For example, the particular client device may display an ordered list of recipients (e.g., Person A, Person B, Person C, Person D) to which to provide the communication, as shown. In some implementations, the particular client device displays the confidence score. For example, the particular client device may display "Confidence Score: 90%", as shown to indicate that the workflow generation system is 90% confident that the proposed workflow is accurate and appropriate based on the communication data received in connection with reference number 125.

As further shown in FIG. 1H, and as shown by reference number 145, the workflow generation system may receive an approval of the proposed workflow from the particular client device. In some implementations, the particular client device may generate the approval of the proposed workflow based on input from the particular user. For example, the particular client device may display the proposed workflow and the confidence score as described above, and may receive an approval of the workflow from the user if the proposed workflow is accurate for this particular situation. Additionally, or alternatively, if the confidence score satisfies a threshold confidence score (e.g., 90%, 95%, 98%, or the like), the workflow generation system may automatically implement the proposed workflow without receiving the approval of the proposed workflow from the client device.

In some implementations, prior to receiving the approval of the proposed workflow, the workflow generation system may receive, from the client device, a request to redetermine the proposed workflow. For example, the workflow generation system may receive the request to redetermine the proposed workflow based on the confidence score. Based on the request, the workflow generation system may reprocess the communication data with the machine learning model to determine another proposed workflow for the communication, and may provide, to the client device, data identifying the other proposed workflow.

In some implementations, prior to receiving the approval of the proposed workflow, the workflow generation system may receive, from the client device, feedback data identifying changes to the proposed workflow. In this case, the workflow generation system may generate a revised workflow based on the feedback data and the communication data.

The workflow generation system may provide, to the client device, data identifying the revised proposed workflow. In some implementations, the workflow generation system may process the feedback data and the communication data with the machine learning model to determine another proposed workflow for the communication, and may provide data identifying the other proposed workflow to the client device.

Figure 1I:
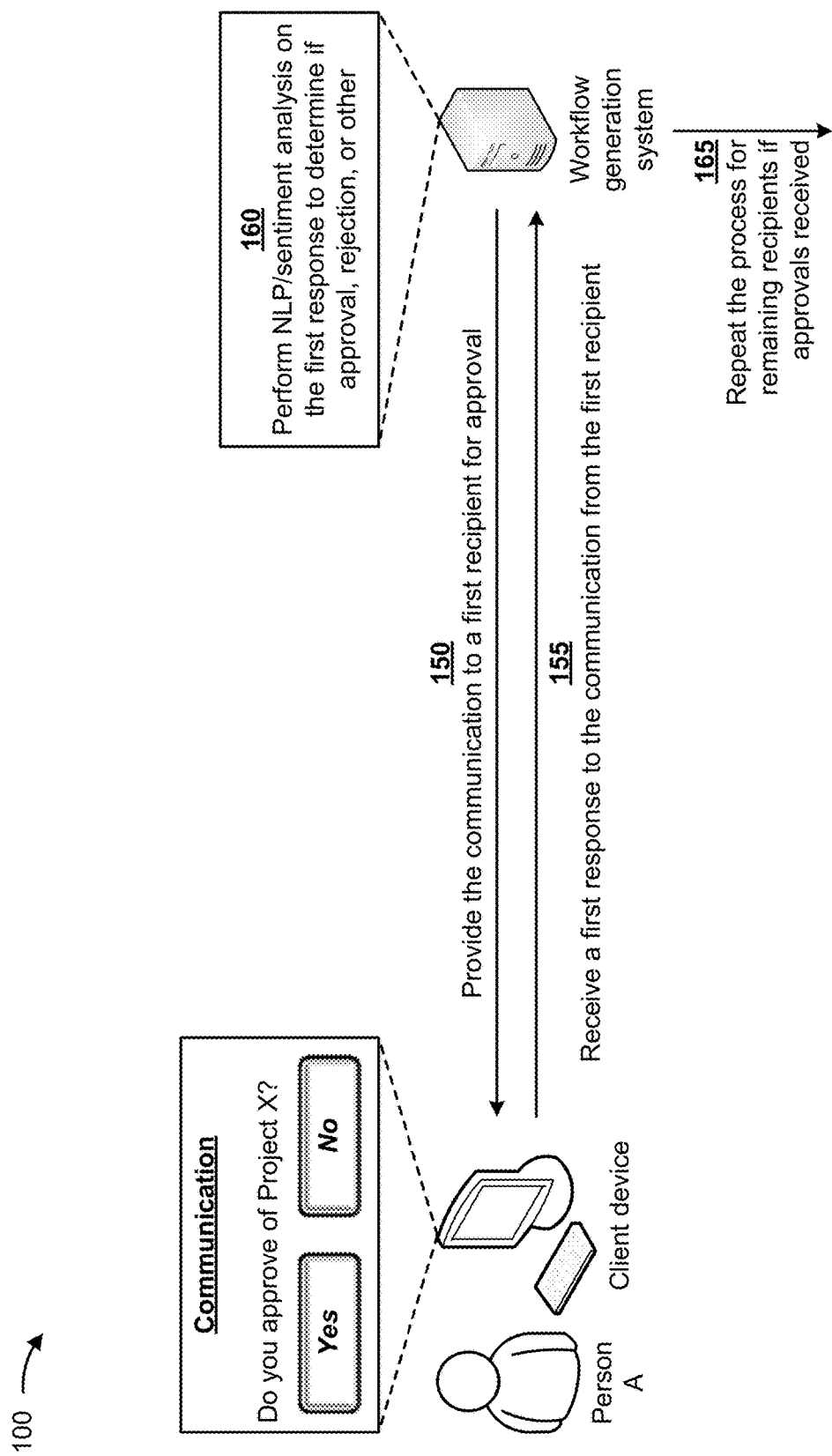

As shown in FIG. 1I, and by reference number 150, the workflow generation system may provide the communication to a first recipient for approval. For example, the workflow generation system may provide the communication to a client device of Person A as the first recipient, based on the ordered list in the proposed workflow. As shown by reference number 155, the workflow generation system may receive a first response to the communication from the first recipient. In some implementations, the workflow generation system may determine whether the response is an approval or rejection based on a specific selection (e.g., from a selection menu, a "Yes" or "No" button as shown, and/or the like). Additionally, or alternatively, the workflow generation system may determine whether the response is an approval or rejection based on interpreting a narrative response. For example, as shown by reference number 160, the workflow generation system may perform natural language processing and/or sentiment analysis on the first response to determine if the response indicates an approval, a rejection, or other (e.g., a commentary).

In some implementations, if the workflow generation system determines that a response includes commentary but does not explicitly indicate an approval or rejection, the workflow generation system may perform further analysis to determine whether the response indicates an approval or rejection. For example, the workflow generation system may perform additional processing with the machine learning model, natural language processing, sentiment analysis, and/or the like. Alternatively, or if further analysis is unable to determine whether the response indicates an approval or rejection, the workflow generation system may automatically generate a communication to the recipient requesting clarification as to whether the response indicates an approval or a rejection, and may proceed based on a reply from the recipient.

As shown by reference number 165, the workflow generation system may repeat the process for the remaining recipients if approvals are received. For example, the workflow generation system may provide the communication to Person B as a second recipient if Person A responds to the communication with an approval, may provide the communication to Person C as a third recipient if Person B responds to the communication with an approval, and may not provide the communication to Person D as a fourth recipient if Person C responds to the communication with a rejection. Alternatively, rather than requiring approvals in direct sequence along a singular line, the workflow generation system may define the approval chain based on different types of sequences. For example, the workflow generation system may initially provide the communication to both a first recipient and a second recipient, and then may provide the communication to a third recipient if either the first recipient or the second recipient responds with an approval. As another example, the workflow generation system may initially provide the communication to both a first recipient and a second recipient as described above, and may provide the communication to a third recipient if the first recipient responds with an approval and to a fourth recipient if the second recipient responds with an approval.

Figure 1J:
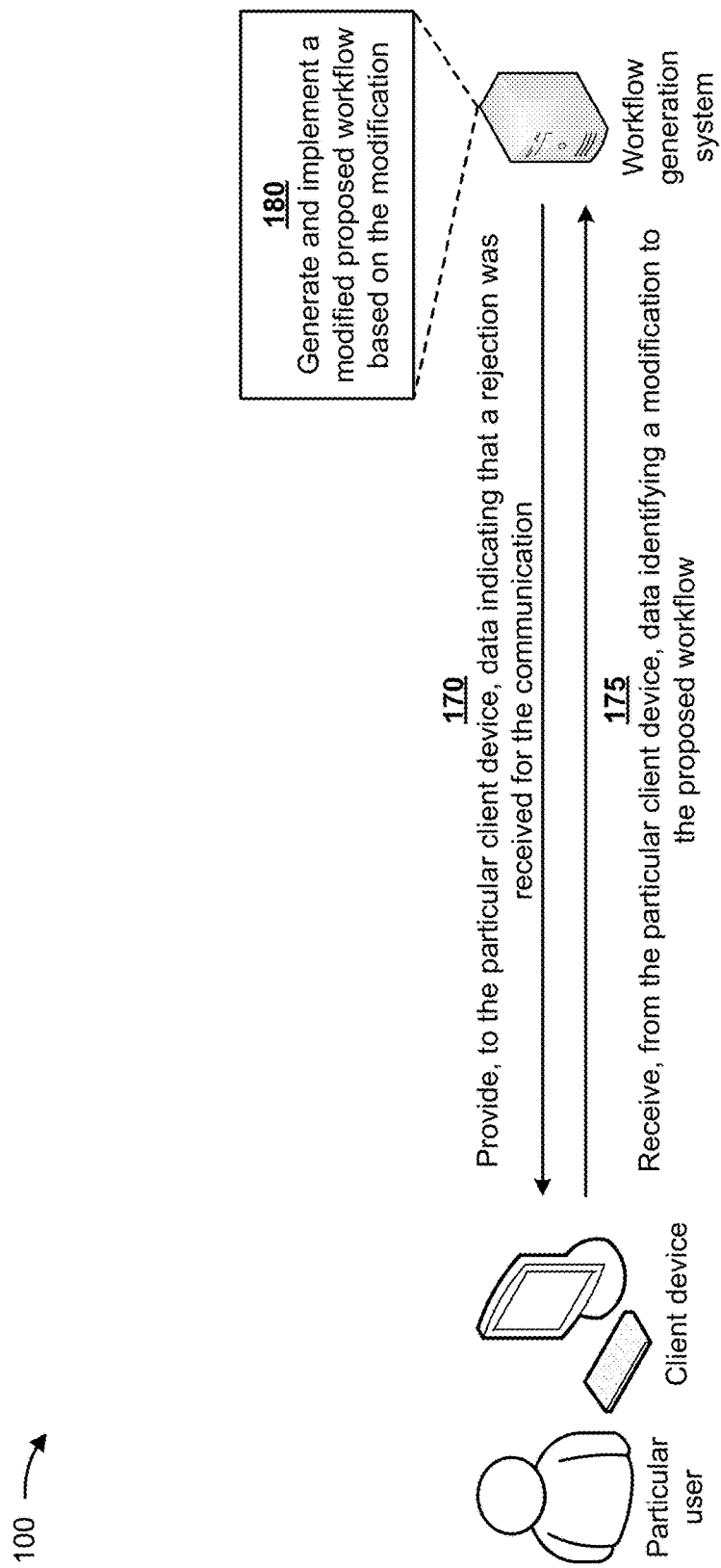

As shown in FIG. 1J, the workflow generation system may modify the proposed workflow based on determining that a response is a rejection. For example, as shown by reference number 170, the workflow generation system may provide, to the particular client device, data indicating that a rejection was received for the communication (e.g., upon receiving a rejection from one of the recipients). As shown by reference number 175, the workflow generation system may receive, from the particular client device, data identifying a modification to the proposed workflow. For example, the particular user may review the response from the recipient that includes the rejection, the particular user may modify the proposed workflow to address an issue raised by the recipient, and may cause the client device to provide, to the workflow generation system, the modified proposed workflow and/or data indicating the modifications to the proposed workflow. Alternatively, rather than obtaining a modification from the particular client device as described in steps 170-175, the workflow generation system may automatically identify a modification to the proposed workflow. In this case, the workflow generation system may thereafter provide data indicating that the rejection was received, and provided the modified proposed workflow, to the client device for approval. As shown by reference number 180, the workflow generation system may generate and implement a modified proposed workflow based on the modification. In this case, the workflow generation system may repeat steps 140-180, as appropriate, with respect to the modified proposed workflow in a fashion similar to the steps described for the proposed workflow above.

In some implementations, the workflow generation system may perform one or more actions based on causing the communication to be provided. For example, the workflow generation system may record results of causing the communication to be provided, and may provide a record of the communication workflow, recipients, and/or responses (e.g., to the particular user). Additionally, or alternatively, the workflow generation system may record results of causing the communication to be provided to the particular recipients, and may retrain the machine learning model based on the results. In some implementations, one or more of the recipients may be automated (e.g., bots), one or more of the client devices may be Internet of Things (IoT) devices, and/or the like.

In this way, the workflow generation system utilizes a machine learning model to automatically generate a proposed workflow. As a result, a workflow can be generated without the user personally determining to generate the workflow, and without the user manually initiating or controlling the workflow or relying on an external workflow system to do so. This, in turn, conserves computing resources (e.g., processing resources, memory resources, communication resources, and/or the like), networking resources, and/or the like that would otherwise be wasted as a result of actions required by the user and/or utilization of an external workflow system, additional actions required to remedy delays in the communications, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
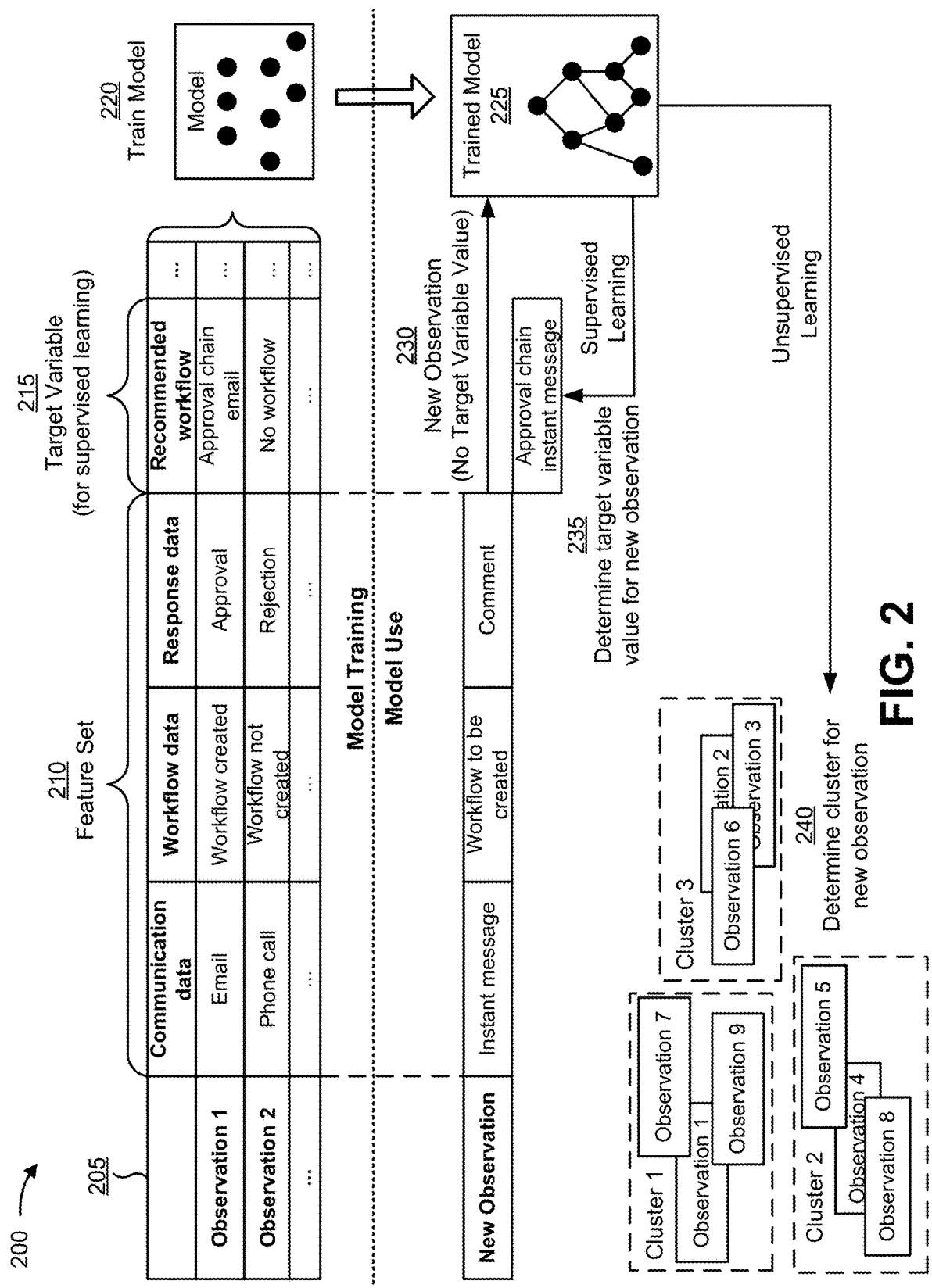
FIG. 2 is a diagram illustrating an example 200 of training and using a machine learning model in connection with generating proposed workflows

FIG. 2 is a diagram illustrating an example 200 of training and using a machine learning model in connection with generating proposed workflows. The machine learning model training and usage described herein may be performed using a machine learning system. The machine learning system may include or may be included in a computing device, a server, a cloud computing environment, and/or the like, such as the cloud computing system 302, client device 330, and/or the like, described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from client devices 330, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from client devices 330. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of communication data, a second feature of workflow data, a third feature of response data, and so on. As shown, for a first observation, the first feature may have a value of "email", the second feature may have a value of "workflow created", the third feature may have a value of "approval", and so on. These features and feature values are provided as examples, and may differ in other examples. For example, the feature set may include one or more of the following features: user role (e.g., manager, team leader, engineer, receptionist, and/or the like), recipient role (e.g., manager, team leader, engineer, receptionist, and/or the like), user recipient relationship (e.g., direct report, indirect report, not a report, and/or the like), number of recipients, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is a recommended workflow, which has a value of "approval chain email" (e.g., email recipients and an order the emails are to be sent to the email recipients) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature value of "instant message", a second feature value of "workflow to be created", a third feature value of "comment", and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of "approval chain instant message" for the target variable of "recommended workflow" for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to provide an approval chain instant message for an identified set of recipients in an identified order. The first automated action may include, for example, an action to automatically initiate the approval chain instant message for the identified set of recipients in the identified order.

As another example, if the machine learning system were to predict a value of "approval chain email" for the target variable of recommended workflow, then the machine learning system may provide a second (e.g., different) recommendation (e.g., provide an approval chain email for an identified set of recipients in an identified order) and/or may perform or cause performance of a second (e.g., different)

automated action (e.g., automatically initiate the approval chain email for the identified set of recipients in the identified order).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., approval chain), then the machine learning system may provide a first recommendation, such as the first recommendation described above (in the case of an instant message). Additionally, or alternatively, the machine learning system may perform a first automated action and/or may cause a first automated action to be performed (e.g., by instructing another device to perform the automated action) based on classifying the new observation in the first cluster, such as the first automated action described above (in the case of an instant message).

As another example, if the machine learning system were to classify the new observation in a second cluster (e.g., no workflow), then the machine learning system may provide a second (e.g., different) recommendation (e.g., do not provide a workflow) and/or may perform or prevent, or cause performance or prevention, of a second (e.g., different) automated action (e.g., do not initiate an automated action). As still another example, if the machine learning system were to classify the new observation in a third cluster (e.g., possible workflow), then the machine learning system may provide a third (e.g., different) recommendation (e.g., request determination by user) and/or may perform or prevent, or cause performance or prevention, of a third (e.g., different) automated action (e.g., automatically initiate an approval change upon confirmation by the user).

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to automatically generate a proposed workflow. The machine learning system enables recognition and/or identification of tens, hundreds, thousands, or millions of features and/or feature values for tens, hundreds, thousands, or millions of observations, thereby increasing accuracy and consistency and reducing delay associated with automatically generating a proposed workflow relative to requiring computing resources to be allocated for tens, hundreds, or thousands of operators to manually generate a proposed workflow using the features or feature values.

As indicated above, FIG. 2 is provided as an example. Other examples may differ from what is described in connection with FIG. 2.

Figure 3:
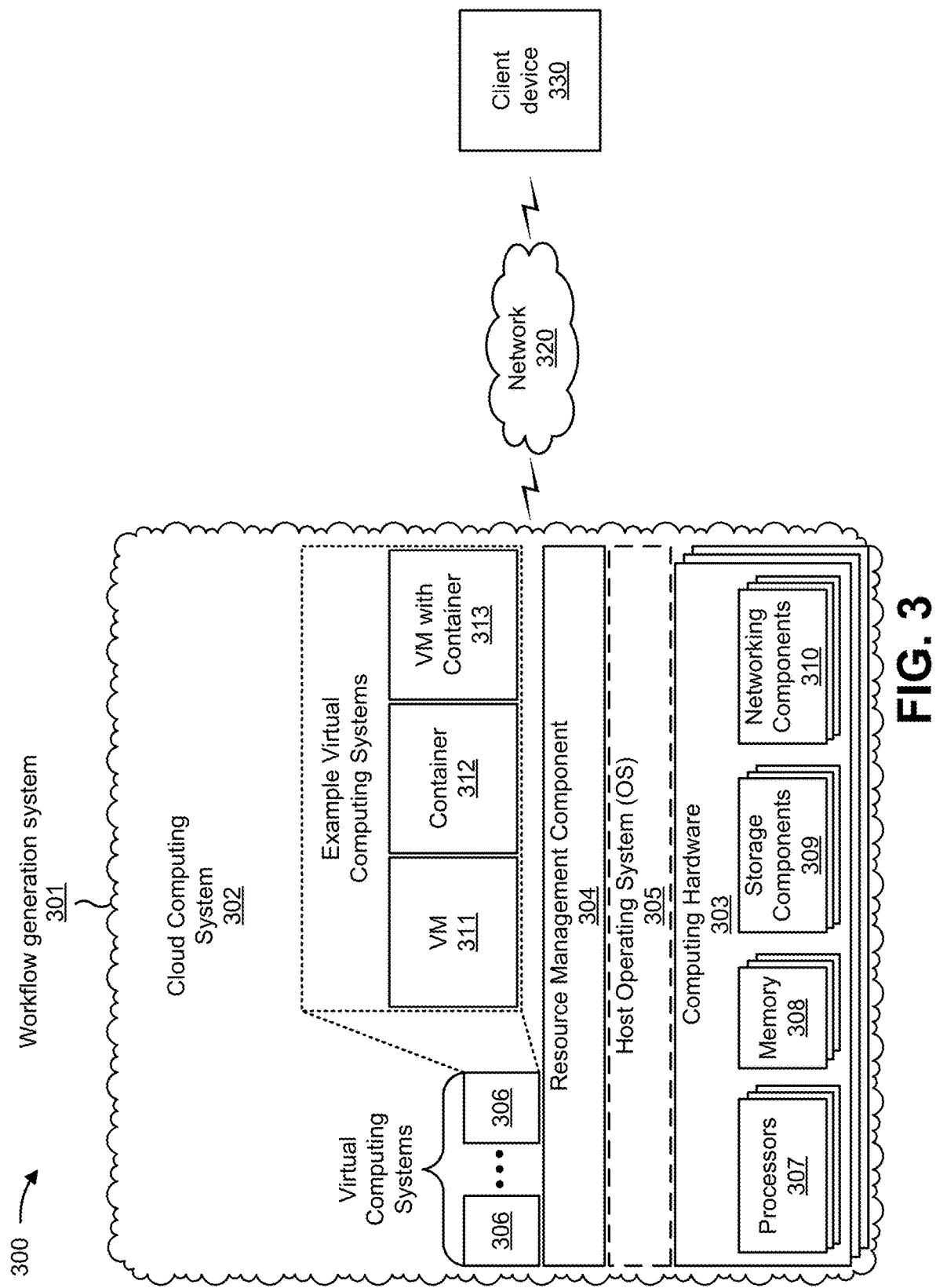
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a workflow generation system 301, which may include one or more elements of and/or may execute within a cloud computing system 302. The cloud computing system 302 may include one or more elements 303-313, as described in more detail below. As further shown in FIG. 3, environment 300 may include a network 320, at least one client device 330, and/or the like. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the workflow generation system 301 may include one or more elements 303-313 of the cloud computing system 302, may execute within the cloud computing system 302, and/or may be hosted within the cloud computing system 302, in some implementations, the workflow generation system 301 may not be cloud-based (e.g., may be implemented outside of a cloud computing system) or may be partially cloud-based. For example, the workflow generation system 301 may include one or more devices that are not part of the cloud computing system 302, such as device 400 of FIG. 4, which may include a standalone server or another type of computing device. The workflow generation system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information associated with utilizing natural language processing and machine learning to automatically generate proposed workflows, as described elsewhere herein. The client device 330 may include a communication device and/or a computing device. For example, the client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
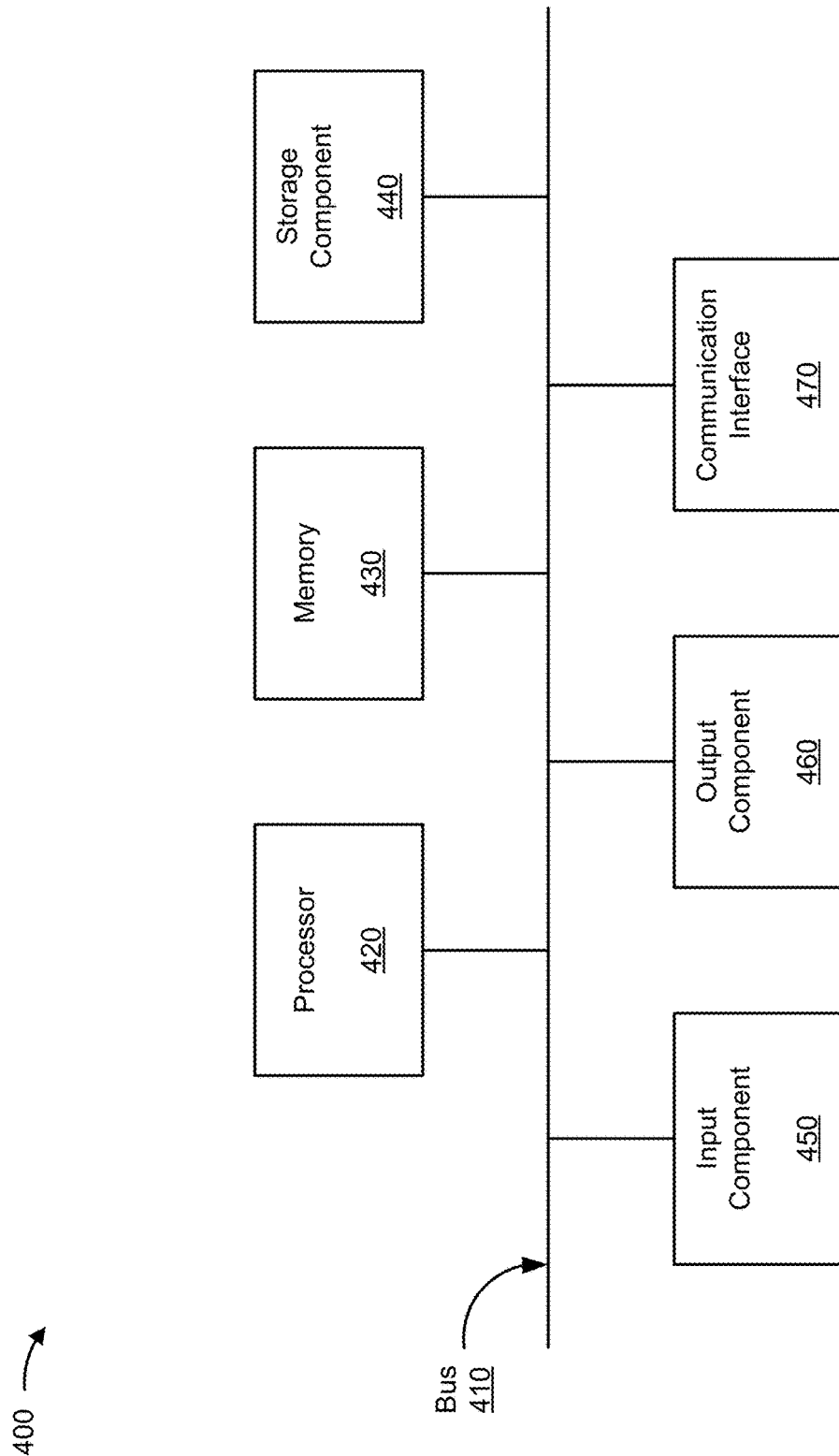
FIG. 4 is a diagram of example components of one or more devices of FIG. 3.

FIG. 4 is a diagram of example components of a device 400, which may correspond to workflow generation system 301, cloud computing system 302, and/or client device 330. In some implementations, workflow generation system 301, cloud computing system 302, and/or client device 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
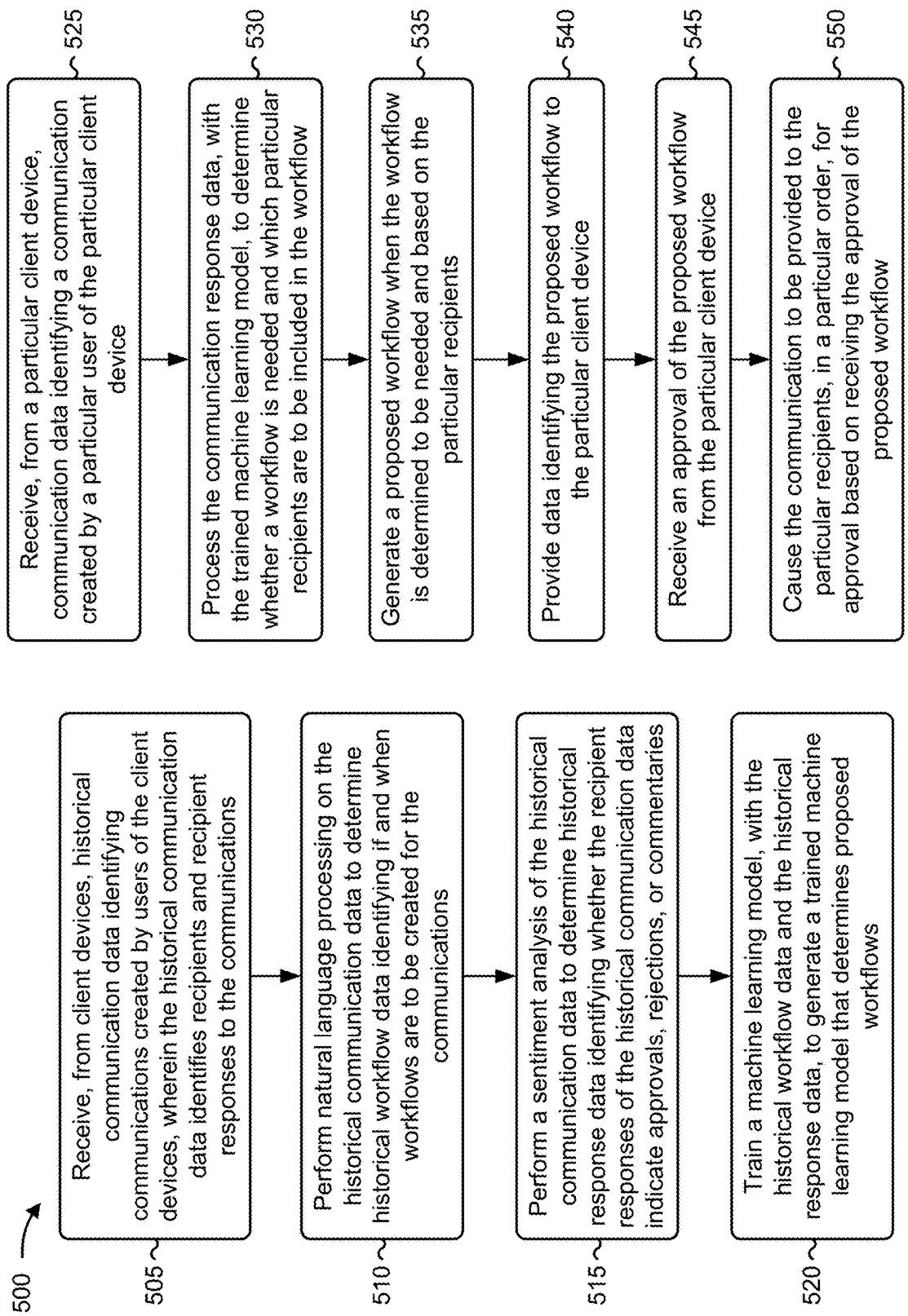
FIGS. 5-7 are flow charts of example processes relating to utilizing natural language processing and machine learning to automatically generate proposed workflows.

FIG. 5 is a flow chart of an example process 500 associated with utilizing natural language processing and machine learning to automatically generate proposed workflows. In some implementations, one or more process blocks of FIG. 5 may be performed by a device, such as a workflow generation system (e.g., workflow generation system 301). In some implementations, one or more process blocks of FIG. 5 may be performed by another device or a group of devices separate from or including the device, such as a client device (e.g., client device 330), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include receiving, from client devices, historical communication data identifying communications created by users of the client devices, wherein the historical communication data identifies recipients and recipient responses to the communications (block 505). For example, the device may receive, from client devices, historical communication data identifying communications created by users of the client devices, as described above. In some implementations, the historical communication data identifies recipients and recipient responses to the communications.

As further shown in FIG. 5, process 500 may include performing natural language processing on the historical communication data to determine historical workflow data associated with characteristics of workflows (block 510). For example, the device may perform natural language processing on the historical communication data to determine historical workflow data associated with characteristics of workflows, as described above.

As further shown in FIG. 5, process 500 may include performing a sentiment analysis of the historical communication data to determine historical response data identifying whether the recipient responses of the historical communication data indicate approvals, rejections, or commentaries (block 515). For example, the device may perform a sentiment analysis of the historical communication data to determine historical response data identifying whether the recipient responses of the historical communication data indicate approvals, rejections, or commentaries, as described above.

As further shown in FIG. 5, process 500 may include training a machine learning model, with the historical workflow data and the historical response data, to generate a trained machine learning model that determines proposed workflows (block 520). For example, the device may train a machine learning model, with the historical workflow data and the historical response data, to generate a trained machine learning model that determines proposed workflows, as described above.

As further shown in FIG. 5, process 500 may include receiving, from a particular client device, communication data identifying a communication created by a particular user of the particular client device (block 525). For example, the device may receive, from a particular client device, communication data identifying a communication created by a particular user of the particular client device, as described above.

As further shown in FIG. 5, process 500 may include processing the communication response data, with the trained machine learning model, to determine whether a workflow is needed and which particular recipients are to be included in the workflow (block 530). For example, the device may process the communication response data, with the trained machine learning model, to determine whether a workflow is needed and which particular recipients are to be included in the workflow, as described above.

As further shown in FIG. 5, process 500 may include generating a proposed workflow when the workflow is determined to be needed and based on the particular recipients (block 535). For example, the device may generate a proposed workflow when the workflow is determined to be needed and based on the particular recipients, as described above.

As further shown in FIG. 5, process 500 may include providing data identifying the proposed workflow to the particular client device (block 540). For example, the device may provide data identifying the proposed workflow to the particular client device, as described above.

As further shown in FIG. 5, process 500 may include receiving an approval of the proposed workflow from the particular client device (block 545). For example, the device may receive an approval of the proposed workflow from the particular client device, as described above.

As further shown in FIG. 5, process 500 may include causing the communication to be provided to the particular recipients, in a particular order, for approval based on receiving the approval of the proposed workflow (block 550). For example, the device may cause the communication to be provided to the particular recipients, in a particular order, for approval based on receiving the approval of the proposed workflow, as described above.

Process 500 may include additional implementations, such as any single implementation or any combination of implementations described below and/or in connection with one or more other processes described elsewhere herein.

In a first implementation, process 500 includes generating a confidence score associated with the proposed workflow; and providing the confidence score the particular client device, wherein the approval of the proposed workflow is being generated based on the confidence score.

In a second implementation, alone or in combination with the first implementation, causing the communication to be provided to the particular recipients includes: causing the communication to be provided to a first recipient of the particular recipients; receiving a first response to the communication from the first recipient, and performing natural language processing or a sentiment analysis on the first response to determine whether the first response indicates approval, rejection, or commentary on the communication.

In a third implementation, alone or in combination with one or more of the first and second implementations, the proposed workflow includes an ordered list of the particular recipients for approving the communication.

In a fourth implementation, alone or in combination with one or more of the first through third implementations, the proposed workflow includes: an ordered list of the particular recipients; data indicating that a first recipient, of the particular recipients, is to receive the communication first, and data indicating that the particular recipients, other than the first recipient, are to receive the communication based on the ordered list.

In a fifth implementation, alone or in combination with one or more of the first through fourth implementations, the communication includes information enabling the particular recipients to one or more of: approve content of the communication, reject the content of the communication, or comment on the content of the communication.

In a sixth implementation, alone or in combination with one or more of the first through fifth implementations, the machine learning model includes a clustering model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
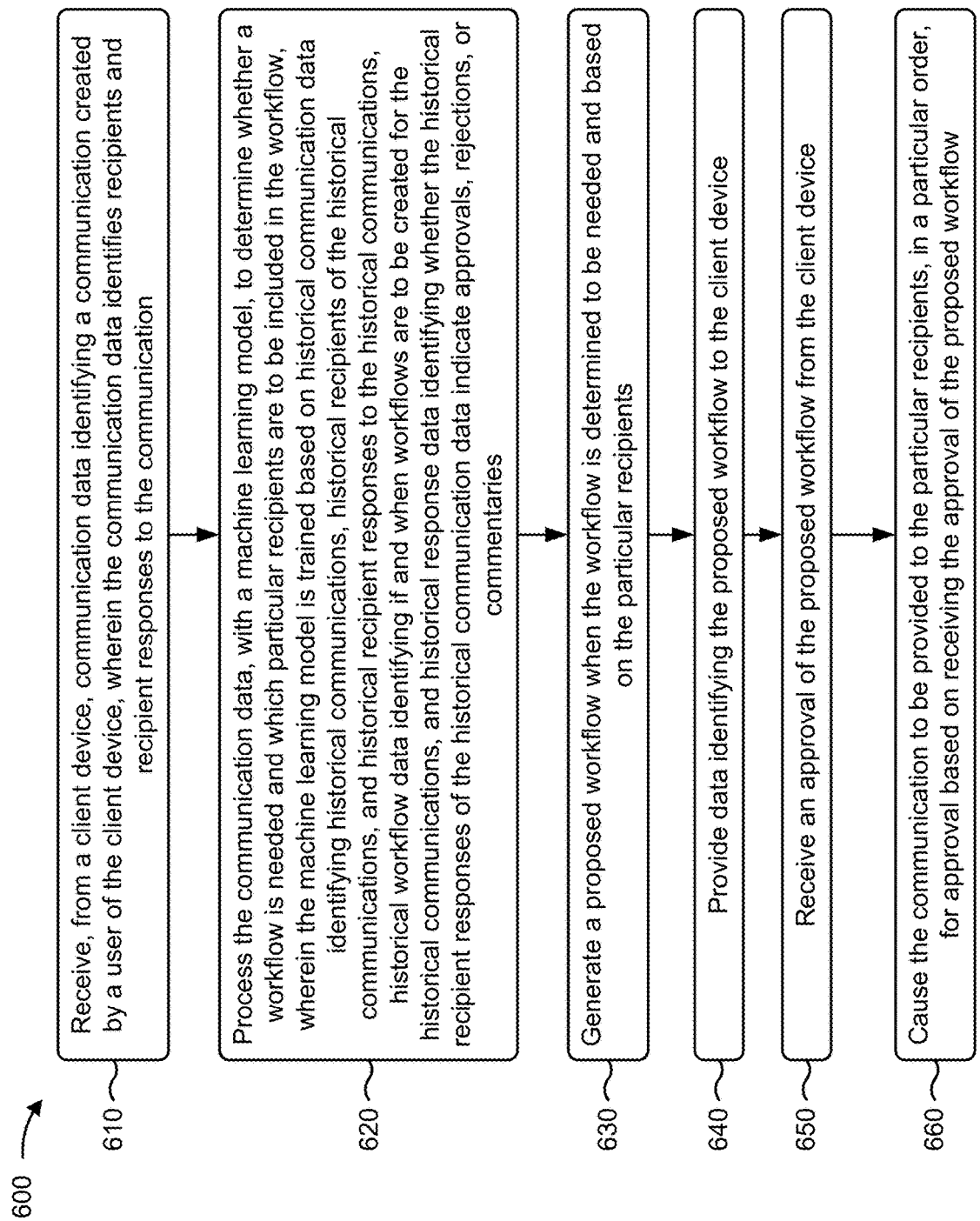

FIG. 6 is a flow chart of an example process 600 associated with utilizing natural language processing and machine learning to automatically generate proposed workflows. In some implementations, one or more process blocks of FIG. 6 may be performed by a device, such as a workflow generation system (e.g., workflow generation system 301). In some implementations, one or more process blocks of FIG. 6 may be performed by another device or a group of devices separate from or including the device, such as a client device (e.g., client device 330), and/or the like. Additionally, or alternatively, one or more process blocks of FIG. 6 may be performed by one or more components of a device 400, such as processor 420, memory 430, storage component 440, input component 450, output component 460, communication interface 470, and/or the like.

As shown in FIG. 6, process 600 may include receiving, from a client device, communication data identifying a communication created by a user of the client device, wherein the communication data identifies recipients and recipient responses to the communication (block 610). For example, the device may receive, from a client device, communication data identifying a communication created by a user of the client device, as described above. In some implementations, the communication data identifies recipients and recipient responses to the communication.

As further shown in FIG. 6, process 600 may include processing the communication data, with a machine learning model, to determine whether a workflow is needed and which particular recipients are to be included in the workflow, wherein the machine learning model is trained based on: historical communication data identifying historical communications, historical recipients of the historical communications, and historical recipient responses to the historical communications, historical workflow data associated with characteristics of workflows, and historical response data identifying whether the historical recipient responses of the historical communication data indicate approvals, rejections, or commentaries (block 620). For example, the device may process the communication data, with a machine learning model, to determine whether a workflow is needed and which particular recipients are to be included in the workflow, as described above. In some implementations, the machine learning model is trained based on.

As further shown in FIG. 6, process 600 may include generating a proposed workflow when the workflow is determined to be needed and based on the particular recipients (block 630). For example, the device may generate a proposed workflow when the workflow is determined to be needed and based on the particular recipients, as described above.

As further shown in FIG. 6, process 600 may include providing data identifying the proposed workflow to the client device (block 640). For example, the device may provide data identifying the proposed workflow to the client device, as described above.

As further shown in FIG. 6, process 600 may include receiving an approval of the proposed workflow from the client device (block 650). For example, the device may receive an approval of the proposed workflow from the client device, as described above.

As further shown in FIG. 6, process 600 may include causing the communication to be provided to the particular recipients, in a particular order, for approval based on receiving the approval of the proposed workflow (block 660). For example, the device may cause the communication to be provided to the particular recipients, in a particular order, for approval based on receiving the approval of the proposed workflow, as described above.

Process 600 may include additional implementations, such as any single implementation or any combination of implementations described below and/or in connection with one or more other processes described elsewhere herein.

In a first implementation, process 600 includes receiving a rejection to the communication from one of the particular recipients; providing, to the client device, data indicating that the rejection to the communication was received; receiving, from the client device and based on the rejection, data identifying a modification to the proposed workflow; generating a modified proposed workflow based on the modification; and providing the communication to a first particular recipient based on the modified workflow.

In a second implementation, alone or in combination with the first implementation, process 600 includes calculating a confidence score for the proposed workflow; providing the confidence score to the client device with the proposed workflow; receiving, from the client device, a request to redetermine the proposed workflow based on the confidence score; reprocessing the communication data, based on the request and with the machine learning model, to determine another proposed workflow for the communication; and providing, to the client device, data identifying the other proposed workflow.

In a third implementation, alone or in combination with one or more of the first and second implementations, process 600 includes receiving, from the client device, feedback data identifying changes to the proposed workflow; reprocessing the feedback data and the communication data, with the machine learning model, to determine another proposed workflow for the communication; and providing, to the client device, data identifying the other proposed workflow.

In a fourth implementation, alone or in combination with one or more of the first through third implementations, process 600 includes calculating a confidence score for the proposed workflow; and automatically is implementing the proposed workflow when the confidence score satisfies a threshold confidence score and without receiving the approval of the proposed workflow from the client device.

In a fifth implementation, alone or in combination with one or more of the first through fourth implementations, the communication data includes data associated with one or more of: an email application, an instant messaging application, a planning application, or a telecommunications application.

In a sixth implementation, alone or in combination with one or more of the first through fifth implementations, process 600 includes recording results of causing the communication to be provided to the particular recipients; and retraining the machine learning model based on the results.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
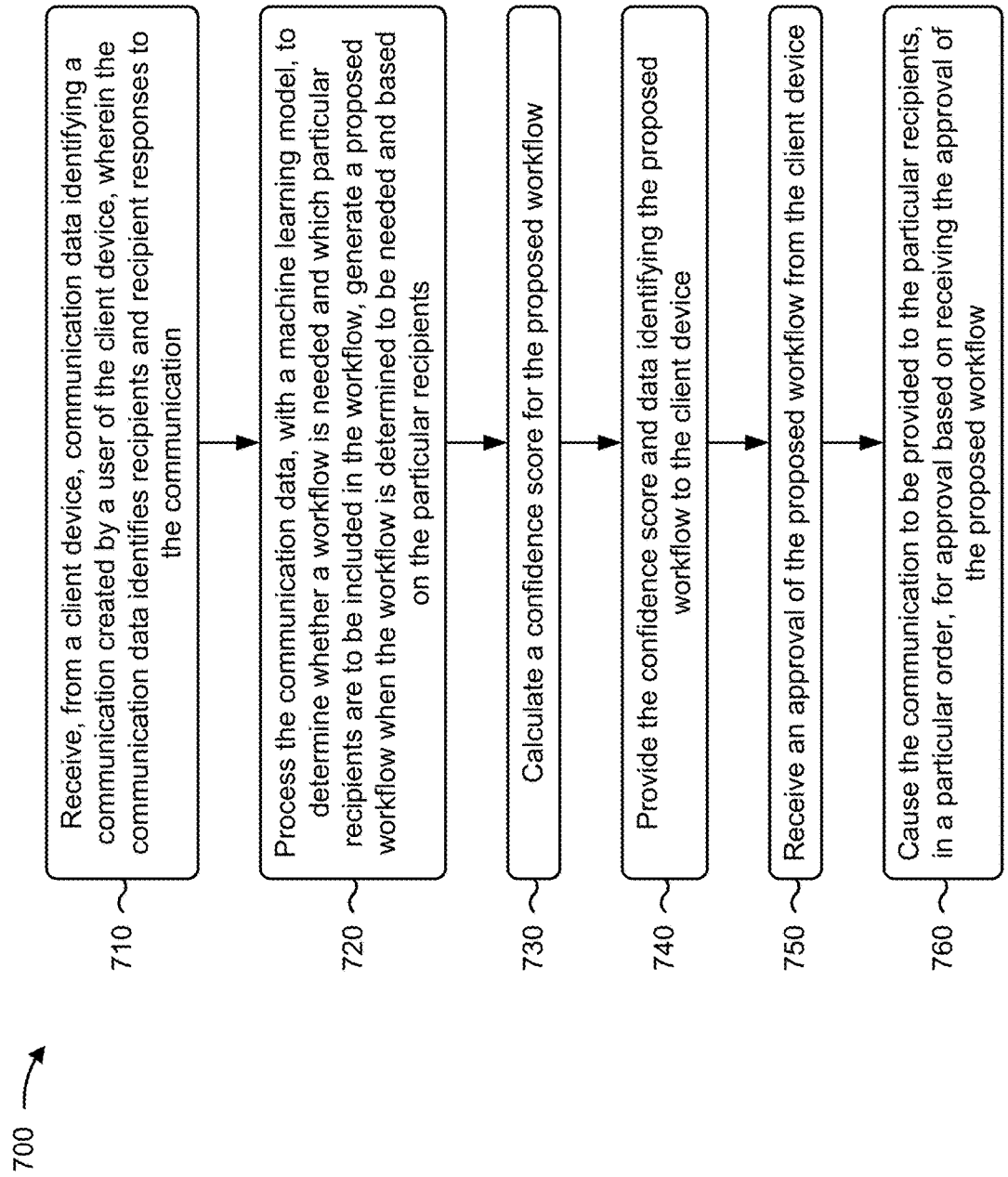

FIG. 7 is a flow chart of an example process 700 associated with utilizing natural language processing and machine learning to automatically generate proposed workflows. In some implementations, one or more process blocks of FIG. 7 may be performed by a device, such as a workflow generation system (e.g., workflow generation system 301). In some implementations, one or more process blocks of FIG. 5 may be performed by another device or a group of devices separate from or including the device, such as a client device (e.g., client device 330), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 7, process 700 may include receiving, from a client device, communication data identifying a communication created by a user of the client device, wherein the communication data identifies recipients and recipient responses to the communication (block 710). For example, the device may receive, from a client device, communication data identifying a communication created by a user of the client device, as described above. In some implementations, the communication data identifies recipients and recipient responses to the communication.

As further shown in FIG. 7, process 700 may include processing the communication data, with a machine learning model, to determine whether a workflow is needed and which particular recipients are to be included in the workflow, generate a proposed workflow when the workflow is determined to be needed and based on the particular recipients (block 720). For example, the device may process the communication data, with a machine learning model, to determine whether a workflow is needed and which particular recipients are to be included in the workflow, as described above.

As further shown in FIG. 7, process 700 may include calculating a confidence score for the proposed workflow (block 730). For example, the device may calculate a confidence score for the proposed workflow, as described above.

As further shown in FIG. 7, process 700 may include providing the confidence score and data identifying the proposed workflow to the client device (block 740). For example, the device may provide the confidence score and data identifying the proposed workflow to the client device, as described above.

As further shown in FIG. 7, process 700 may include receiving an approval of the proposed workflow from the client device (block 750). For example, the device may receive an approval of the proposed workflow from the client device, as described above.

As further shown in FIG. 7, process 700 may include causing the communication to be provided to the particular recipients, in a particular order, for approval based on receiving the approval of the proposed workflow (block 760). For example, the device may cause the communication to be provided to the particular recipients, in a particular order, for approval based on receiving the approval of the proposed workflow, as described above.

Process 700 may include additional implementations, such as any single implementation or any combination of implementations described below and/or in connection with one or more other processes described elsewhere herein.

In a first implementation, causing the communication to be provided to the particular recipients includes: causing the communication to be provided to a first recipient of the particular recipients; receiving a first response to the communication from the first recipient; and performing natural language processing or a sentiment analysis on the first response to determine whether the first response indicates approval, rejection, or commentary on the communication.

In a second implementation, alone or in combination with the first implementation, the proposed workflow includes: an ordered list of the particular recipients; data indicating that a first recipient, of the particular recipients, is to receive the communication first, and data indicating that the particular recipients, other than the first recipient, are to receive the communication based on the ordered list.

In a third implementation, alone or in combination with one or more of the first and second implementations, process 700 further includes: receiving a rejection to the communication from one of particular recipients; providing, to the client device, data indicating that the rejection to the communication was received; receiving, from the client device and based on the rejection, data identifying a modification to the proposed workflow; generating a modified proposed workflow based on the modification, and providing the communication to a first particular recipient based on the modified proposed workflow.

In a fourth implementation, alone or in combination with one or more of the first through third implementations, process 700 further includes recording results of causing the communication to be provided to the particular recipients, and retraining the machine learning model based on the results.

In a fifth implementation, alone or in combination with one or more of the first through fourth implementations, the communication includes information enabling the particular recipients to one or more of: approve content of the communication, reject the content of the communication, or comment on the content of the communication.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from client devices, historical communication data identifying historical communications created by users of the client devices,
       wherein the historical communication data identifies recipients and recipient responses to the historical communications;
   performing, by the device, natural language processing on the historical communication data to determine historical workflow data associated with characteristics of workflows;
   performing, by the device, a sentiment analysis of the historical communication data to determine historical response data identifying whether the recipient responses of the historical communication data indicate approvals, rejections, or commentaries;
   training, by the device, a machine learning model, based on a feature set, associated with the historical workflow data and the historical response data, and a target value specific to one or more proposed workflows associated with the historical workflow data and the historical response data, to generate a trained machine learning model that determines the one or more proposed workflows;
   receiving, by the device and from a particular client device, communication data identifying a communication created by a particular user of the particular client device;
   processing, by the device, the communication data, with the trained machine learning model, to determine whether a workflow, different from the one or more proposed workflows, is needed and which particular recipients are to be included in the workflow;
   generating, by the device and using the trained machine learning model, a new proposed workflow when the workflow is determined to be needed and based on the particular recipients,
       wherein generating the new proposed work flow comprises:
           determining, using the trained machine learning model, a particular order in which the particular recipients are to receive the communication;
   generating, by the device, a confidence score associated with the new proposed workflow;
   providing, by the device, the confidence score to the particular client device;
   providing, by the device, data identifying the new proposed workflow to the particular client device;
   receiving, by the device, an approval of the new proposed workflow from the particular client device,
       wherein the approval of the new proposed workflow is generated based on the confidence score; and
   causing, by the device, the communication to be provided to the particular recipients, in the particular order, for approval based on receiving the approval of the new proposed workflow;
   receiving, by the device and based on causing the communication to be provided to the particular recipients, results associated with the communication; and
   retraining the machine learning model based on the results.

2. The method of claim 1, wherein causing the communication to be provided to the particular recipients comprises:
   causing the communication to be provided to a first recipient of the particular recipients;
   receiving a first response to the communication from the first recipient; and
   performing natural language processing or another sentiment analysis on the first response to determine whether the first response indicates approval, rejection, or commentary on the communication.

3. The method of claim 1, wherein the new proposed workflow includes an ordered list of the particular recipients for approving the communication.

4. The method of claim 1, wherein the new proposed workflow includes:
   an ordered list of the particular recipients;
   data indicating that a first recipient, of the particular recipients, is to receive the communication first; and
   data indicating that the particular recipients, other than the first recipient, are to receive the communication based on the ordered list.

5. The method of claim 1, wherein the communication includes information enabling the particular recipients to one or more of:
   approve content of the communication,
   reject the content of the communication, or
   comment on the content of the communication.

6. The method of claim 1, wherein the machine learning model includes a clustering model.

7. The method of claim 1, wherein the confidence score is generated using the trained machine learning model.

8. A device, comprising:
   one or more memories; and
   one or more processors, coupled to the one or more memories, configured to:
       receive, from a client device, communication data identifying a communication created by a user of the client device,
           wherein the communication data identifies recipients and recipient responses to the communication;
       process the communication data, with a machine learning model, to determine whether a workflow is needed and which particular recipients are to be included in the workflow, wherein the machine learning model is trained based on:
  a feature set associated with:
    historical communication data identifying historical communications, historical recipients of the historical communications, and historical recipient responses to the historical communications,
    historical workflow data associated with characteristics of workflows, and
    historical response data identifying whether the historical recipient responses of the historical communication data indicate approvals, rejections, or commentaries, and
  a target value specific to one or more proposed workflows associated with the historical communication data, the historical workflow data, and the historical response data,
    wherein the one or more proposed workflows are different from the workflow;
generate, using the machine learning model, a new proposed workflow when the workflow is determined to be needed and based on the particular recipients,
  wherein the one or more processors, to generate the new proposed workflow, are configured to:
    determine, using the machine learning model, a particular order in which the particular recipients are to receive the communication;
generate a confidence score associated with the new proposed workflow;
provide the confidence score to the client device;
provide data identifying the new proposed workflow to the client device;
receive an approval of the new proposed workflow from the client device,
  wherein the approval of the new proposed workflow is generated based on the confidence score;
cause the communication to be provided to the particular recipients, in the particular order, for approval based on receiving the approval of the new proposed workflow; and
receive, based on causing the communication to be provided to the particular recipients, results associated with the communication; and
retrain the machine learning model based on the results.

9. The device of claim 8, wherein the one or more processors are further configured to:
  receive a rejection to the communication from one of the particular recipients;
  provide, to the client device, data indicating that the rejection to the communication was received;
  receive, from the client device and based on the rejection, data identifying a modification to the new proposed workflow;
  generate a modified proposed workflow, of the new proposed workflow, based on the modification; and
  provide the communication to a first particular recipient based on the modified proposed workflow.

10. The device of claim 9, wherein the machine learning model includes a clustering model.

11. The device of claim 8, wherein the one or more processors are further configured to:
  calculate another confidence score for the new proposed workflow;
  provide the other confidence score to the client device with the new proposed workflow;
  receive, from the client device, a request to redetermine the new proposed workflow based on the other confidence score;
  reprocess the communication data, based on the request and with the machine learning model, to determine another new proposed workflow for the communication; and
  provide, to the client device, data identifying the other new proposed workflow.

12. The device of claim 8, wherein the one or more processors are further configured to:
  receive, from the client device, feedback data identifying changes to the new proposed workflow;
  reprocess the feedback data and the communication data, with the machine learning model, to determine another new proposed workflow for the communication; and
  provide, to the client device, data identifying the other new proposed workflow.

13. The device of claim 8, wherein the one or more processors are further configured to:
  calculate another confidence score for the new proposed workflow; and
  automatically implement the new proposed workflow when the other confidence score satisfies a threshold confidence score and without receiving the approval of the new proposed workflow from the client device.

14. The device of claim 8, wherein the communication data includes data associated with one or more of:
  an email application,
  an instant messaging application,
  a planning application, or
  a telecommunications application.

15. The device of claim 8, wherein the one or more processors are further configured to:
  record results of causing the communication to be provided to the particular recipients; and
  retrain the machine learning model based on the results.

16. A non-transitory computer-readable medium storing instructions, the instructions comprising:
  one or more instructions that, when executed by one or more processors, cause the one or more processors to:
    receive, from a client device, communication data identifying a communication created by a user of the client device,
      wherein the communication data identifies recipients and recipient responses to the communication;
    process the communication data, with a machine learning model, to determine whether a workflow is needed and which particular recipients are to be included in the workflow,
      wherein the machine learning model is trained based on:
        a feature set associated with at least one of:
          historical communication data identifying historical communications, historical recipients of the historical communications, and historical recipient responses to the historical communications,
          historical workflow data associated with characteristics of workflows, or
          historical response data identifying whether the historical recipient responses of the historical communication data indicate approvals, rejections, or commentaries, and
        a target value specific to one or more proposed workflows associated with the historical communication data, the historical workflow data, and the historical response data,
  wherein the one or more proposed workflows are different from the workflow,
generate, using the machine learning model, a new proposed workflow when the workflow is determined to be needed and based on the particular recipients,
  wherein the one or more instructions, that cause the one or more processors to generate the new proposed workflow, cause the one or more processors to:
    determine, using the machine learning model, a particular order in which the particular recipients are to receive the communication;
generate a confidence score associated with the new proposed workflow;
provide the confidence score and data identifying the new proposed workflow to the client device;
receive an approval of the new proposed workflow from the client device,
  wherein the approval of the new proposed workflow is generated based on the confidence score;
cause the communication to be provided to the particular recipients, in the particular order, for approval based on receiving the approval of the new proposed workflow;
receive, based on causing the communication to be provided to the particular recipients, results associated with the communication; and
retrain the machine learning model based on the results.

17. The non-transitory computer-readable medium of claim 16, wherein the one or more instructions, that cause the one or more processors to cause the communication to be provided to the particular recipients, cause the one or more processors to:
  cause the communication to be provided to a first recipient of the particular recipients;
  receive a first response to the communication from the first recipient; and
  perform natural language processing or a sentiment analysis on the first response to determine whether the first response indicates approval, rejection, or commentary on the communication.

18. The non-transitory computer-readable medium of claim 16, wherein the new proposed workflow includes:
  an ordered list of the particular recipients;
  data indicating that a first recipient, of the particular recipients, is to receive the communication first; and
  data indicating that the particular recipients, other than the first recipient, are to receive the communication based on the ordered list.

19. The non-transitory computer-readable medium of claim 16, wherein the instructions further comprise:
  one or more instructions that, when executed by the one or more processors, cause the one or more processors to:
    receive a rejection to the communication from one of particular recipients;
    provide, to the client device, data indicating that the rejection to the communication was received;
    receive, from the client device and based on the rejection, data identifying a modification to the new proposed workflow;
    generate a modified proposed workflow, of the new proposed workflow, based on the modification; and
    provide the communication to a first particular recipient based on the modified proposed workflow.

20. The non-transitory computer-readable medium of claim 16, wherein the communication includes information enabling the particular recipients to one or more of:
  approve content of the communication,
  reject the content of the communication, or
  comment on the content of the communication.

* * * * *